(12) United States Patent
Edwards et al.

(10) Patent No.: US 11,694,171 B2
(45) Date of Patent: Jul. 4, 2023

(54) FUNDS NETWORK AND METHOD

(71) Applicant: INGO MONEY, INC., Alpharetta, GA (US)

(72) Inventors: Drew W. Edwards, Canton, GA (US); John R. Simoneaux, Franklin, TN (US); Steven D. Doctor, Marietta, GA (US); Richard C. Pinson, Franklin, TN (US)

(73) Assignee: INGO MONEY, INC., Alpharetta, GA (US)

( * ) Notice: Subject to any disclaimer, the term of this patent is extended or adjusted under 35 U.S.C. 154(b) by 0 days.

(21) Appl. No.: 13/767,624

(22) Filed: Feb. 14, 2013

(65) Prior Publication Data

US 2013/0212008 A1 Aug. 15, 2013

Related U.S. Application Data

(60) Provisional application No. 61/599,371, filed on Feb. 15, 2012.

(51) Int. Cl.
*G06Q 20/10* (2012.01)
*G06Q 20/38* (2012.01)

(52) U.S. Cl.
CPC ........... *G06Q 20/10* (2013.01); *G06Q 20/381* (2013.01)

(58) Field of Classification Search
None
See application file for complete search history.

(56) References Cited

U.S. PATENT DOCUMENTS

| | | | |
|---|---|---|---|
| 4,109,238 A | | 8/1978 | Creekmore |
| 5,053,607 A | * | 10/1991 | Carlson et al. ................. 705/18 |
| 5,265,007 A | | 11/1993 | Barnhard, Jr. et al. |
| 5,583,759 A | | 12/1996 | Geer |
| 5,717,868 A | | 2/1998 | James |
| 5,910,988 A | | 6/1999 | Ballard |
| 5,920,847 A | | 7/1999 | Koi et al. |
| 5,930,778 A | | 7/1999 | Geer |
| 5,974,146 A | | 10/1999 | Randle et al. |
| 6,032,137 A | | 2/2000 | Ballard |
| 6,065,675 A | | 5/2000 | Teicher |

(Continued)

FOREIGN PATENT DOCUMENTS

WO WO 98/28699 7/1998

OTHER PUBLICATIONS

International Search Report and Written Opinion for corresponding Patent Cooperation Treaty application No. PCT/US2013/026216, dated Apr. 18, 2013.

(Continued)

*Primary Examiner* — Robert R Niquette
(74) *Attorney, Agent, or Firm* — Nelson Mullins Riley & Scarborough LLP

(57) ABSTRACT

In a method of providing funds to a monetary repository, information is received identifying a payee and request by the payee to convert a negotiable instrument made to the payee to funds. In response to the information, confirmation is received whether to convert the negotiable instrument to funds. An image of the endorsed negotiable instrument is received. If a determination is made to convert the negotiable instrument to funds, an amount of funds corresponding to a value of the negotiable instrument is directed to a repository.

15 Claims, 19 Drawing Sheets

(56) References Cited

U.S. PATENT DOCUMENTS

| | | | |
|---|---|---|---|
| 6,129,273 A * | 10/2000 | Shah | 235/380 |
| 6,594,647 B1 | 7/2003 | Randle et al. | |
| 7,016,524 B2 | 3/2006 | Moore | |
| 7,177,836 B1 | 2/2007 | German et al. | |
| 7,257,246 B1 * | 8/2007 | Brodie | G06K 9/00577 |
| | | | 382/119 |
| 7,257,426 B1 | 8/2007 | Witkowski et al. | |
| 7,415,442 B1 | 8/2008 | Battaglini et al. | |
| 7,494,052 B1 * | 2/2009 | Carpenter et al. | 235/379 |
| 7,529,710 B1 | 5/2009 | Clower et al. | |
| 7,555,462 B2 | 6/2009 | Dutta et al. | |
| 7,620,603 B2 | 11/2009 | Gilder et al. | |
| 7,627,525 B2 | 12/2009 | Williams | |
| 7,668,780 B2 | 2/2010 | Battaglini et al. | |
| 7,778,457 B2 * | 8/2010 | Nepomniachtchi et al. | 382/137 |
| 7,783,563 B2 | 8/2010 | Tidwell et al. | |
| 7,856,402 B1 | 12/2010 | Kay | |
| 7,873,200 B1 | 1/2011 | Oakes, III et al. | |
| 7,885,451 B1 | 2/2011 | Walls et al. | |
| 7,885,880 B1 | 2/2011 | Prasad et al. | |
| 7,949,587 B1 | 5/2011 | Morris et al. | |
| 7,970,677 B1 | 6/2011 | Oakes, III et al. | |
| 7,974,899 B1 | 7/2011 | Prasad et al. | |
| 7,996,312 B1 | 8/2011 | Beck et al. | |
| 8,000,514 B2 | 8/2011 | Nepomniachtchi et al. | |
| 8,577,118 B2 | 11/2013 | Nepomniachtchi et al. | |
| 8,708,227 B1 * | 4/2014 | Oakes, III | G06Q 20/042 |
| | | | 235/379 |
| 8,768,836 B1 * | 7/2014 | Acharya | G06F 40/174 |
| | | | 705/42 |
| 8,799,147 B1 * | 8/2014 | Walls | G06Q 40/02 |
| | | | 705/38 |
| 2002/0065786 A1 | 5/2002 | Martens et al. | |
| 2002/0178112 A1 * | 11/2002 | Goeller | G07G 1/14 |
| | | | 705/39 |
| 2003/0023555 A1 | 1/2003 | Rees | |
| 2003/0225708 A1 | 12/2003 | Park et al. | |
| 2004/0236688 A1 | 11/2004 | Bozeman | |
| 2005/0015317 A1 | 1/2005 | Rodriguez et al. | |
| 2005/0033685 A1 | 2/2005 | Reyes | |
| 2005/0082364 A1 | 4/2005 | Alvarez et al. | |
| 2005/0097046 A1 * | 5/2005 | Singfield | G07F 19/202 |
| | | | 705/42 |
| 2006/0041506 A1 | 2/2006 | Mason et al. | |
| 2006/0189382 A1 * | 8/2006 | Muir | G07F 17/3232 |
| | | | 463/29 |
| 2006/0242063 A1 * | 10/2006 | Peterson | G06Q 20/042 |
| | | | 705/42 |
| 2007/0095894 A1 | 5/2007 | Kerridge | |
| 2008/0046368 A1 | 2/2008 | Tidwell et al. | |
| 2008/0076572 A1 * | 3/2008 | Nguyen | G07F 17/3269 |
| | | | 463/42 |
| 2008/0126249 A1 | 5/2008 | Garcia | |
| 2008/0185427 A1 * | 8/2008 | Herrington | G06Q 20/042 |
| | | | 235/379 |
| 2008/0262954 A1 | 10/2008 | Nally | |
| 2008/0294547 A1 | 11/2008 | Zigman | |
| 2009/0070263 A1 | 3/2009 | Davis et al. | |
| 2009/0094124 A1 | 4/2009 | Foss, Jr. | |
| 2009/0171827 A1 | 7/2009 | Callahan et al. | |
| 2009/0173781 A1 | 7/2009 | Ramachandran | |
| 2010/0082470 A1 * | 4/2010 | Walach | G06Q 20/0425 |
| | | | 705/35 |
| 2010/0123003 A1 | 5/2010 | Olson et al. | |
| 2010/0127069 A1 | 5/2010 | Henton, Sr. | |
| 2010/0150424 A1 * | 6/2010 | Nepomniachtchi | H04N 1/00204 |
| | | | 382/140 |
| 2010/0161466 A1 | 6/2010 | Gilder | |
| 2010/0174647 A1 | 7/2010 | Kowalchyk et al. | |
| 2010/0198733 A1 | 8/2010 | Gantman et al. | |
| 2011/0062232 A1 | 3/2011 | Smith et al. | |
| 2011/0087598 A1 | 4/2011 | Bozeman | |
| 2011/0134248 A1 | 6/2011 | Heit et al. | |
| 2011/0170740 A1 | 7/2011 | Coleman | |
| 2011/0191161 A1 | 8/2011 | Dai | |
| 2011/0245968 A1 * | 10/2011 | Kubo | G07F 19/20 |
| | | | 700/237 |
| 2012/0023017 A1 * | 1/2012 | Votaw | G06Q 20/1085 |
| | | | 705/43 |
| 2012/0177281 A1 * | 7/2012 | Frew | G06Q 20/042 |
| | | | 382/137 |
| 2012/0226609 A1 | 9/2012 | Ebbert et al. | |
| 2013/0204783 A1 * | 8/2013 | Klose | G06Q 20/042 |
| | | | 705/42 |
| 2013/0259357 A1 | 10/2013 | Ebbert et al. | |

OTHER PUBLICATIONS

Reedy, Sarah, What's in Your [Mobile] Wallet?, Telephony, vol. 249, No. 13, pp. 12-14,16, Sep. 2008, PRIMEDIA Intertec Corp., USA.

Patel, Bhavik., Mobile Deposit Poised to Ease the Mixed-Remittance Dilemma, The Journal of Work Process Improvement, vol. 9, No. 4, S4, Jul.-Aug. 2009, Association for Work Process Improvement, USA.

Fowler, Geoffrey A., App Watch: PayPal Lets You Cash Checks on Your Phone, Sep. 30, 2010, Technology News and Insights.

Mitek Systems Inc—RDM and Mitek Systems to Provide Mobile Check Deposit RDM to Target Small Businesses with ImageNet Mobile Deposit(tm) Application for Blackberry(tm) and iPhone(tm), Feb. 24, 2009, Market News Publishing, Inc.

* cited by examiner

FUNDS NETWORK AND METHOD

The present application claims priority to U.S. provisional application Ser. No. 61/599,371, filed Feb. 15, 2012, entitled FUNDS NETWORK AND METHOD, the entire disclosure of which is hereby incorporated by reference herein.

BACKGROUND OF THE INVENTION

Services have existed for converting negotiable instruments into good funds. As used herein, "good funds" refers to funds that are transferred to a recipient without risk on the recipient's part that the funds will be reversed. Currency is a traditional form of good funds when transferred without underlying contractual obligations, but good funds also encompass electronic and other non-physical currency value transferred without recourse against the recipient.

A person in possession of a negotiable instrument may need to direct funds to accounts that are associated with the person, such as prepaid card accounts, invoice accounts, or direct deposit bank accounts, or other functions such as money transfers. Depending on the desired destination, the account manager may accept funds in various forms. For instance, a local public utility might accept checks drawn on direct deposit bank accounts. Managers of pre-paid services accounts generally do not accept checks but may accept funds delivered by direct deposit payroll files to their bank accounts. Where the person does not have a deposit bank account or, in the case of prepaid services, a payroll direct deposit relationship, however, the managers generally require a source of good funds in order to finalize receipt of the funds such that the funds are available for the intended purpose. A prepaid card issuer, for example, requires good funds be received into an account in order to make the funds available for withdrawal through use of a prepaid card associated with the account.

A person in possession of a negotiable instrument such as a check (for ease of example, the discussion herein refers to checks, but this is for purposes of explanation only, and it should be understood that the present discussion can encompass other types of negotiable instruments) may acquire good funds through a check cashing entity that makes a unilateral decision, in some cases based on its own criteria and upon information it may acquire from the instrument holder or a check risk management service, whether to cash the check. Alternatively, the check cashing entity may have a relationship with a check guarantor service, under which the check cashing entity provides certain predetermined information to the check guarantor, and in response to which the check guarantor approves or denies the check. If the check cashing entity decides to cash the check, alone or in conjunction with a check risk management service or guarantor, the check cashing entity may provide currency to the instrument holder, less a fee, and the holder endorses the check over to the check cashing entity.

If the check cashing entity cashes the check and provides currency to the check presenter, the presenter may then present currency to managers of respective accounts to which the presenter desires to direct funds. Alternatively, some check cashing entities provide an additional service of directing good funds to such account managers.

For example, assume a consumer presents a retailer with a check made to the consumer and that the retailer makes a determination, either locally or with the assistance of a check risk management service or guarantor, to cash the check. Following that decision, or in some instances prior to check verification, the consumer endorses the check over to the retailer and provides instructions to the retailer regarding an account to which the consumer wishes to direct funds.

The retailer then directs good funds in the amount of the check or some portion thereof, less fees charged to the consumer, to the desired account, for example via a load network. The load network is an entity that maintains a server system that can be accessed remotely, typically over the Internet or through a link to a retailer's point of sale system. The load network maintains contractual agreements with managers of prepaid debit card accounts that allow the load network to direct funds to the prepaid accounts. The load network also maintains contractual agreements with check cashing entities (e.g. the retailer in this example) under which the load network has the ability to transfer funds involved in a transaction from designated deposit accounts owned by these entities. Accordingly, when the retailer receives and decides to cash the consumer's check, and when the consumer provides instructions to the retailer directing the retailer to direct check proceeds to a reloadable prepaid card, the retailer accesses the load network server and provides an instruction to the load network to transfer an amount of funds equal to the check value, less fees charged to the consumer, to an account associated with the card issuer. In response, the load network transfers the requested amount of funds from the retailer's deposit account designated in the agreement between the retailer and the load network to the requested prepaid card account. The load network may also transfer to itself a portion of the fee, again pursuant to the agreement between the retailer and the load network.

Through the load network, the retailer provides funds to the prepaid card account manager without recourse either to the load network or the account manager in the event the check returns. For example, if the check is returned for insufficient funds or other reasons, the retailer does not reverse the transaction back to the load network and/or the card issuer. In some instances, there may be an agreement between the retailer and the card issuer under which funds may be reversed in order to facilitate collection on the check, but such agreement does not relieve the retailer of ultimate responsibility for the funds if the check is not collected. The funds transfer remains in place, and liability thus rests with the retailer. If the retailer contracts with a check guarantor, the retailer may mitigate its risk by allocating some or all of the retailer's risk to the check guarantor, but regardless, liability rests with the retailer from the perspective of the load network and the card issuer.

In this system, the load network derives revenue (i.e. a fee assessed from the fee retained by the retailer from the check proceeds, as described above) from the transactions independently of the card issuer and/or the entity managing the card accounts. The prepaid issuer typically pays for membership in the load network but isn't charged a per-transaction fee for the receipt of good funds. The prepaid card issuer retains its fee from the load amount received from the load network. This fee arises from the agreement between the card issuer and the consumer and is independent of the relationship between the card issuer and the load network. In some cases, when the retailer decides to cash a check and then load the proceeds onto a prepaid card through a load network, the retailer waives all or some part of either the retailer fee to cash the check or the load network fee, but this is independent of the card issuer.

Check guarantors may have consumer-accessible outlets (e.g. at retail or stand-alone facilities) at which a consumer may present a check for cashing.

Referring to an exemplary prior art transaction 10 illustrated in FIG. 1, a consumer 12 has a plurality of checks 14 in a physical wallet 16. The checks are made to consumer 12 as the payee. Consumer 12 presents the checks to a check cashing service provider 18, which could be a retailer or a stand-alone check cashing entity. If the consumer has an existing deposit account and credit relationship with a bank, the consumer could simply cash the check through the deposit account bank. Even if the consumer has such a banking relationship, however, the consumer may not have sufficient knowledge about the check maker to have confidence in the funds. If the consumer cashes the check at the direct deposit bank, the bank will generally charge the check amount back to the consumer in the event the check is returned. Check cashing service provider 18 may have recourse against the consumer but, as a practical matter, may not be sure of its ability to recover the check funds. Thus, as noted above, the check cashing service provider typically accepts the risk of the check being returned and therefore charges a fee to the consumer for cashing the checks.

Assuming consumer 12 presents the check to check cashing service provider 18, an operator at the facility may acquire identification information from the consumer, e.g. orally and/or through inspection of identification documentation such as a drivers license, and query a check guarantor or risk management service (e.g. through a local network or an Internet connection) regarding whether the consumer is enrolled in its system. If, after receiving the consumer information, the check guarantor or risk management service does not have a record for the consumer in its system, the check guarantor/service responds to the check cashing service provider with a message that the consumer is not enrolled in the system. The operator then requests further information from the consumer and forwards the consumer information to the check guarantor/service. Assuming the consumer is enrolled, or becomes enrolled, the operator may acquire information about the check, for example the payee, the maker, the maker's bank, the amount, the type of check, and the date. The operator may acquire check information through visual inspection of the check and/or by scanning the check to read the magnetic ink character recognition (MICR) data and/or for remote inspection. Check validation may occur locally at the check cashing service provider but may also be made in conjunction with the remote check risk management service and/or guarantor. A risk management service advises a check cashing entity about risk, whereas a guarantor accepts the risk of cashing a check. Assuming validation via a remote entity, the operator at check cashing service 18 may communicate (e.g. through a local network or an Internet connection) the check information to the check guarantor or risk management service.

The check guarantor/service assesses a risk in cashing the check, based on the consumer information, the check information, database information, and potentially other factors. Based on the risk assessment, the check guarantor/service communicates (through an electronic message and/or by voice communication) a decision to the operator at the check cashing facility whether to cash the check. If the decision is that the check should not be cashed, the transaction ends. If the decision is to cash the check, check-cashing service provider 18 provides cash to the consumer, ending the transaction.

While check cashing services traditionally have been provided by companies for which check cashing is the company's only business, more recently retailers, banks and other businesses choose to offer this service.

At 13, after obtaining cash for a check, the consumer may utilize the cash to acquire prepaid services or otherwise allocate the cash. In some instances, this may occur as a net transaction from the consumer's perspective, without the consumer ever receiving physical currency. Nonetheless, there are two separate transactions (i.e. (a) check cashing and (b) funds allocation, where the second transaction involves the account manager, but the first (i.e. check cashing) occurs independently of the account manager).

For example, the consumer may allocate the funds to a reloadable pre-paid card, at 20. Prepaid cards, of various types, have been known for many years, generally beginning with closed loop gift cards and evolving into today's general purpose reloadable ("GPR") cards. Prepaid cards can be generally classified as reloadable or single load cards. Single load cards are static. Once purchased and assigned a value, they cannot be reloaded with additional funds. In contrast, re-loadable cards can be replenished with funds after their initial purchase. Single load cards can be purchased anonymously. As there is no need to identify the purchaser, the single load card itself carries no information about the customer/purchaser. In contrast, a reloadable card is, in essence, backed by a bank account and is therefore associated with card owner identification information. The bank is responsible for completing identity verification in compliance with a written customer identification policy ("CIP").

Although a reloadable card is generally issued by a bank, the cards and their associated accounts are generally managed by a separate entity, and thus the term "account manager" is used herein. Thus, with respect to a reloadable card, the term "manager" should be understood to refer to the bank and/or a separate managing entity, if applicable.

If the consumer wishes to load the check proceeds to a reloadable card, but does not yet have a card, the consumer may acquire a card from a vendor or directly from a reloadable card account manager, for example via the Internet or retail outlets. In such a transaction, the consumer enrolls with the card account manager by providing information to set up an account in the card account manager's system.

Assuming the consumer has a card, the consumer provides that portion of the now-acquired cash the consumer wishes to allocate to the prepaid card account to a vendor having a relationship with either the card manager or a load network. Through such relationships, the vender loads, in essence deposits, the proceeds onto the card, i.e. into an account associated with the card, at the account manager. The consumer fee associated with this load is typically deducted from the proceeds and retained by the vendor and the load network.

For example, assume a consumer purchases or reloads a card at a retail facility at which the consumer cashes a check. If the consumer is not enrolled in the card manager's system, the consumer may provide enrollment information at the retailer's customer service desk, which communicates with the card manager over a network connection to enroll the customer. Upon enrolling, or if the consumer has an existing card, the customer may proceed to a retailer checkout station. A checkout clerk swipes the card through a magnetic card reader at the clerk's point of sale device. The point-of-sale device reads the card, acquires card information from the card, and communicates that information to a load network. Upon being informed by the consumer of the amount the consumer wishes to load to the card, the clerk enters the requested amount (plus a fee) through the point-of-sale device keyboard and accepts the cash proceeds from the consumer. The point-of-sale device electronically notifies the load network that the check proceeds have been accepted for allocation to the card manager account associated with the card (via the card number read by the point-of-sale device). Pursuant to an agreement between the load network and the retailer, the load network transfers the requested amount from an account owned by the retailer to the card manager account. The load network transfers a portion of the fee to the load network, with the remainder of the fee remaining in the retailer's account.

Consumer 12 may also allocate some or all of the check proceeds to a money transfer at 22. As should be understood, a money transfer is a remitter-to-recipient service maintained by a service provider, for example WESTERN UNION. The consumer manually presents the desired funds to the money transfer service provider and instructs the service provider to allocate the designated amount of funds for transfer to a designated recipient. Consumer 12 may also allocate some or all of the check proceeds to an automatic bill paying account, such as provided by services such as CHECKFREE PAY, at 24, purchase a money order from a money order provider at 26, and/or pay for a prepaid telephone card at 28. At any of these steps, the manager (i.e. WESTERN UNION, CHECKFREE PAY, the money order provider, or the telephone card provider in these examples) may charge a fee to the consumer. A retailer may provide access to such managers, such that the consumer may allocate funds to the repository managers at the retail check out system, as individual transactions.

Systems and methods are known for capturing an image of a check and submitting the check to a financial institution for deposit to an account owned by the check payee. For instance, a bank may provide applications operable on a depositor's mobile telephone, by which the depositor may acquire images of checks and transmit the images to the depositor's bank. The bank, in turn, deposits the check proceeds into the depositor's account, sometimes making the funds available immediately but more generally at some time over the following one to five days or according to the bank's availability schedule.

SUMMARY OF THE INVENTION

One or more embodiments of the present invention may recognize and address disadvantages of prior art constructions and methods as described above.

In one embodiment of a method of converting to funds a negotiable instrument made to a payee, a computerized system is provided that is accessible to remote parties through a computer network and that is controlled by an entity. At the computerized system, via a first network and from a device remote from the computerized system, information is received that identifies a payee and indicates a request from the payee to convert a negotiable instrument made to the payee to funds. Also at the computerized system from the remote device through the first network, an image of the negotiable instrument is received. An image of the negotiable instrument is presented to an operator from the computerized system via a display. At the computerized system from the operator via an interface, information is received that classifies the negotiable instrument to a type of instrument maker among a predetermined plurality of types of negotiable instrument makers. A fee is determined for converting the negotiable instrument to funds based at least in part on the type of instrument maker. At the remote device via a user interface, an option is presented to the payee to accept the fee. At the computerized system from the remote device via the first network, information is received from the payee indicating a response to the option. Depending at least in part upon whether the information from the payee indicates the payee accepts the fee, the negotiable instrument is processed, at the computerized system, for conversion to funds. Through the computer network, settlement of the negotiable instrument is directed.

In another embodiment, a method of converting to funds a negotiable instrument made to a payee includes providing a computerized system that is accessible to remote parties through a computer network and that is controlled by an entity. At the computerized system via a first network from a device remote from the computerized system, information is received that identifies a payee and indicates a request from the payee that a negotiable instrument made to the payee be approved for conversion to funds. At the computerized system, a plurality of protocols is provided for converting negotiable instrument to funds. Each protocol of the plurality of protocols bases conversion of a negotiable instrument to funds at least in part on a current of a predetermined triggering condition that is different from the triggering condition of each other protocol. At the remote device via a user interface, an option is presented to the payee to select a protocol of the plurality of protocols for conversion of the negotiable instrument to funds. At the computerized system from the remote device via the network, instructions are received from the payee indicating a said protocol selected by the payee. At the computerized system, the negotiable instrument is processed for conversion to funds upon occurrence of the predetermined triggering condition corresponding to the selected protocol. Settlement of the negotiable instrument is directed through the computer network.

In a still further embodiment, a method of converting to funds a negotiable instrument made to a payee includes providing a first computerized system that is accessible to remote parties through a computer network and that is controlled by an entity. At the first computerized system via a first network from a user interface at a device remote from the computerized system, information is received identifying a payee and indicating a request from the payee to convert a negotiable instrument made to the payee to funds. The user interface is in communication with the first computerized system and with a second computerized system controlled by an entity that manages at least one of reloadable debit card transactions and reloadable debit card accounts. At the first computerized system from the remote device through the first network, an image of the negotiable instrument is received. A fee is determined for converting the negotiable instrument to funds in response to the first computerized system and the second computerized system. At the remote device via user interface, an option is presented to the payee to accept the fee. At the computerized system from the remote device via the first network, information is received from the payee indicating a response to the option. Depending at least in part upon whether the information from the payee indicates the payee accepts the fee, the negotiable instrument is processed at the computerized system for conversion to funds directed to a reloadable debit card account via the second computerized system. Settlement of the negotiable instrument is directed through the first computer network.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended figures, in which.

Figure 1:
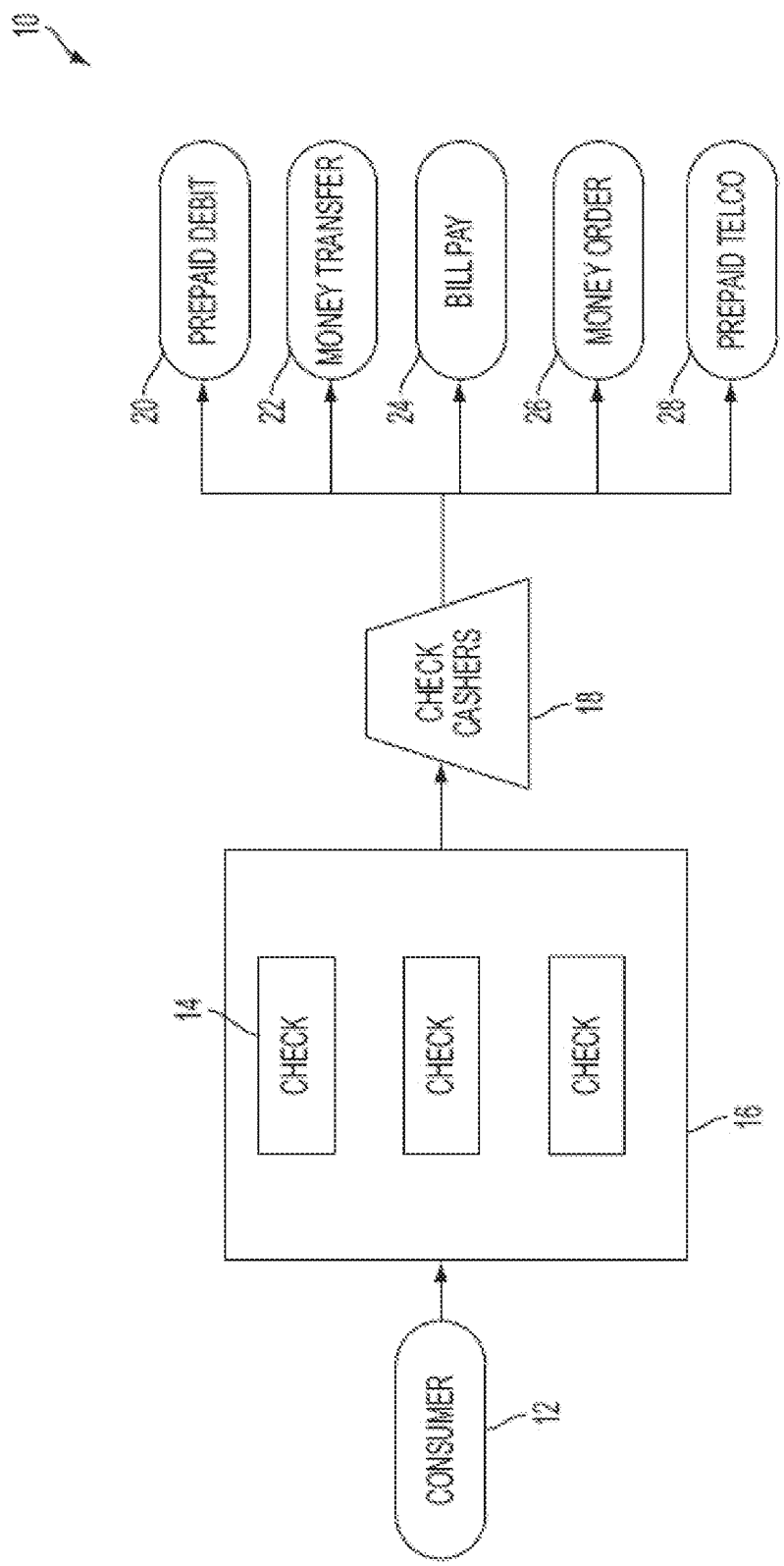
FIG. 1 is a schematic view of a prior art check cashing transaction.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 4:
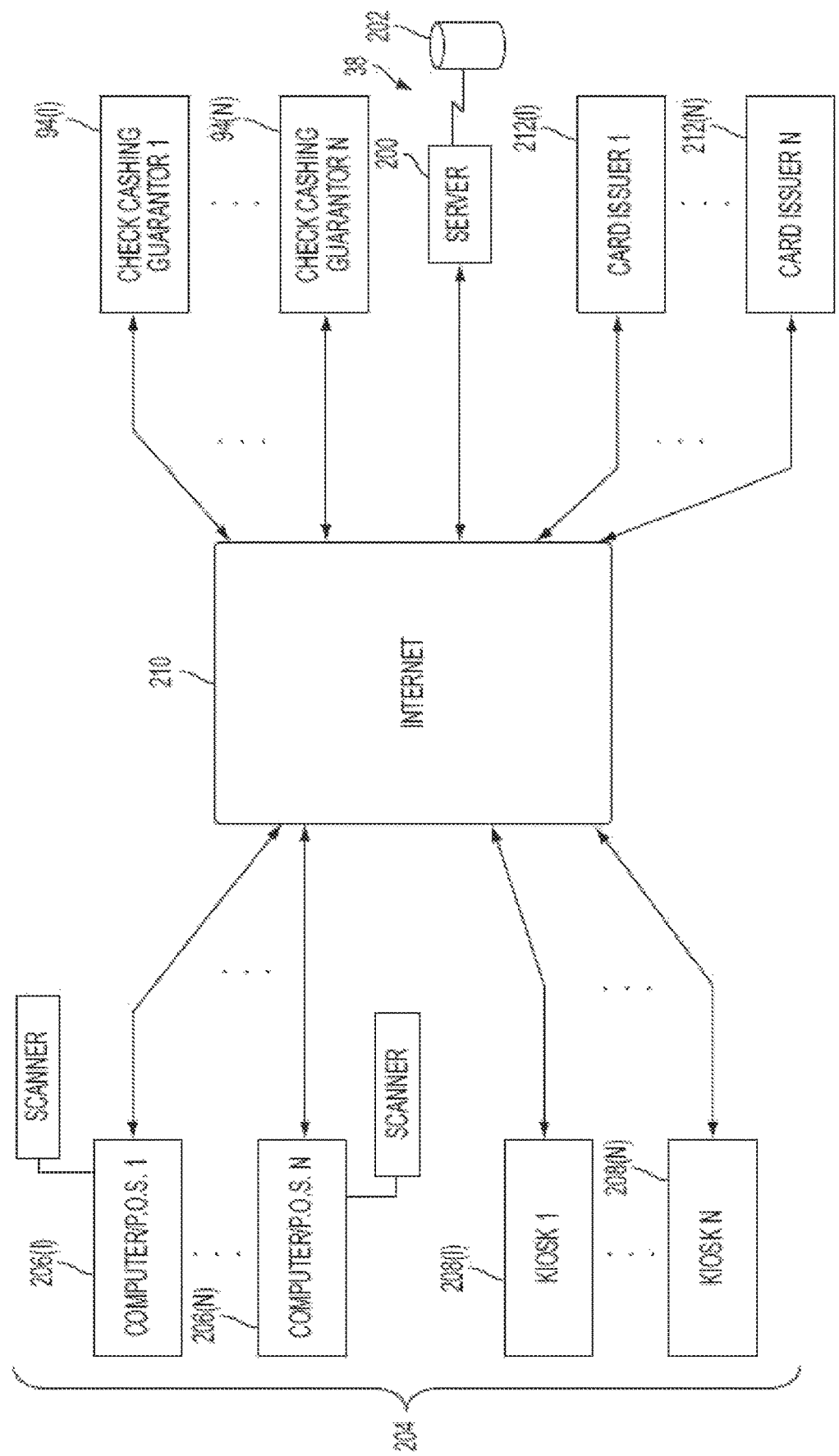
FIG. 4 is a schematic view of a system according to an embodiment of the present invention.
Figure 5:
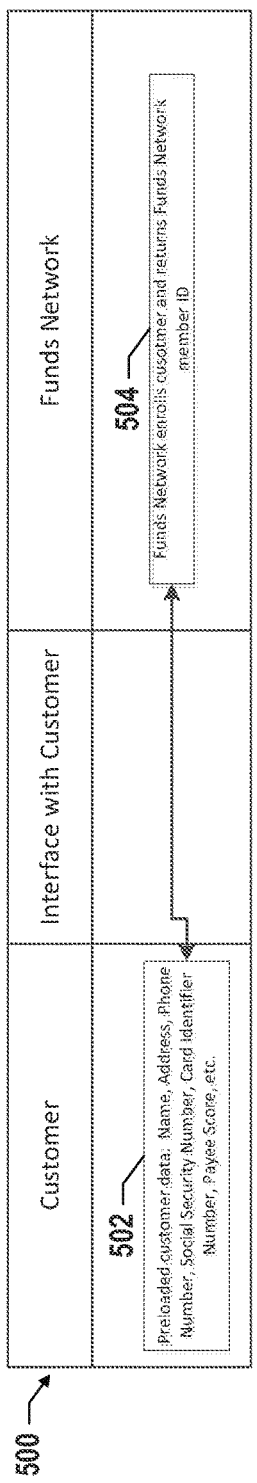
FIG. 5 is a flow diagram view of a method of enrolling a customer into the funds network according to an embodiment of the present invention.

One or more embodiments of the invention described herein are implemented at least partially as and/or using computer programs for use with a computer system, such as, for example, the network environment shown in FIG. 4 and described herein. The programs define functions of these embodiments (including one or more methods described herein) and can be contained on a variety of computer-readable media, for example, information stored on non-writable storage media (for example, read-only memory devices within a computer (for example server 200) such as CD-ROM discs readable by a CD-ROM drive), alterable information stored on writable storage media, and information conveyed to a computer by a communications medium, such as through a computer or telephone network, including wireless communications. The latter embodiment specifically includes information and functions downloaded from the internet and other networks. Such computer-readable media, when carrying computer-readable instructions that direct the functions of one or more embodiments of the present invention, represent embodiments of the present invention.

In general, routines executed to implement embodiments of the present invention described herein may be part of an operating system for a specific application, component, program, module, object, or sequence of instructions. The computer program typically is comprised of a multitude of instructions that may be translated by a computer into a machine-readable format and hence executable instructions. Also, programs are comprised of variables and data structures that either reside locally to the computer program or are found in memory or on storage devices. In addition, various programs effecting methods described herein may be identified based upon the application for which they are implemented in a specific embodiment. However, it should be appreciated that the invention should not be limited to use solely in any specific application or function identified and/or implied herein.

FIG. 4 illustrates a network environment. Client computer systems (e.g. 206, 208, 94 and 212) as described herein include interfaces that enable network communications with other systems (e.g. server 200) over the network. The network may be comprised of remote network connections, among geographically distributed systems, including network connections over the Internet. Each client computer system generally includes a central processing unit connected by a bus to memory and storage (not shown). Each client computer system typically runs an operating system configured to manage interaction between computer hardware and higher-level software applications running on the client system.

Server 200 may include hardware components similar to those used by the client computer systems. Accordingly, server 200 generally includes a CPU, memory, and storage devices coupled by a bus. The server also runs an operating system and may include a runtime component and a database management system. In response to functions performed by an application running on the server, the runtime component may receive queries in response to which the runtime component generates Structured Query Language (SQL) queries that it provides to the database management system for execution in conjunction with database 202.

The network environment illustrated in FIG. 4 is, however, merely an example of one computing environment. Embodiments of the present invention may be implemented using other environments, regardless whether the computer systems are complex multi-user computer systems, such as a cluster of individual computers connected by a high-speed network, single-user workstations, or network appliances lacking non-volatile storage. Further, the software applications described herein may be implemented using computer software applications executed on existing computer systems that are not limited to any currently existing computing environment or programming language, and may be adapted to take advantage of new computing systems as they become available.

In certain embodiments as described herein, users of computer systems interact with client computer systems and/or server 200 using one or more graphical user interfaces (GUI). GUI content may comprise hypertext markup language (HTML) documents (i.e., web-pages) rendered on the computer system using a web browser. In such an embodiment, server 200 may include a hypertext transfer protocol secure (HTTPS) server configured to respond to HTTPS requests from client systems and transmit HTML documents to client systems. The web-pages themselves may be static documents stored on server 200 or generated dynamically using the application server interacting with the web-server to service HTTPS requests. Alternatively, client applications may comprise a database, or query application program running on the client system. The web-browser and application may be configured to allow a user to compose an abstract query, and to submit the query to a runtime component for processing.

FIG. 4 illustrates a system according to an embodiment of the present invention. Although the embodiment is described with respect to funds derived from a check, it should be understood that funds may be derived from other negotiable instruments, such as time drafts or promissory notes, within the scope of systems and methods encompassed by the present invention. A funds network 38 is embodied by one or more computer servers 200 and databases 202. Although a single server is indicated for computer server 200, and a single database for database 202, it should be understood that the network may be comprised of multiple servers and databases, whether located locally and networked through a local area network or remotely through a wide area network or an Internet connection. Thus, the single representations at 200 and 202 are provided for purposes of illustration only and should be understood to represent such other configurations. Moreover, particularly where a consumer interacts with the funds network through an automated teller machine or other automated device, such as kiosks 208(1)-208(N), the funds network may be considered to include such automated devices.

A plurality of check cashing entities, represented at 204, may comprise stand-alone check cashing facilities 206(1)-206(N) and/or a plurality of unmanned automated teller machines or kiosks 208(1)-208(N), all in communication with server 200 through remote connections, for example through the Internet 210. In general, the check cashing entities are remote from the funds network in that the check cashing entities and the funds network do not have common control over their respective computer systems and databases. In general, but not necessarily, the check cashing entities and the funds network do not communicate over a common, dedicated communications wired or wireless link, but rather communicate over a communication network or system that is independent of both the check cashing entity and the funds network. Further, some or all communications between and among remote parties and entities as described herein are, in at least one embodiment, made over secure communication channels, e.g. employing encryption techniques. Encryption methods and systems should be well understood, are not part of the present invention in-and-of themselves, and are therefore not discussed in further detail herein.

Stand-alone check cashing facilities 206 may be respectively operated by an on-site human operator who communicates with the funds network through a computer system at the stand-alone facility via the independent communication network. The check-cashing facility may be operated by the owner of, and as part of, funds network 38 or by a retailer or other entity unrelated to the funds network. Each facility 206 comprises a computer with a data entry or capture device or devices, for example a keyboard, card reader, and check scanner through which the operator communicates with funds network 38 and server 200 to provide information relevant to the transaction, as described in more detail below. Remote, customer-operated devices 208, such as automated teller machines, kiosks, or mobile telephones, tablets or other devices, are not necessarily operated by the check-cashing entity but may have interface software through which the person presenting the instrument communicates with the funds network and/or the check-cashing entity or other entity, such as a reloadable debit card manager. Kiosks and ATMs 208 may have a similar configuration to the computer system at 206, with the same data entry or capture devices. Where a mobile device is used, via an application loaded on the mobile device, data may be keyed into the device, and a check image may be captured by a camera on the phone. Computer software resident on the terminals or in a cloud configuration effect the transactions described in more detail below. Where funds network 38 owns and/or operates the check-cashing entity, it performs both the check-cashing entity and funds network roles as described herein, and it should be understood that operation as the funds network does not preclude the network's operation also as a check-cashing entity or other component of the transaction, such as a check guarantor. In general, the check cashing entity is the acquirer of the negotiable instrument in that the check cashing entity acquires possession of the negotiable instrument from the payee (or a transferee from the payee) for purposes of converting the negotiable instrument to funds, through a settlement system. From the payee's perspective, the acquirer is the immediate intermediary between the payee and the settlement process.

Terminals and/or servers located at check cashing guarantors 94(1)-94(N), and a plurality of prepaid card issuers/managers 212(1)-212(N), communicate with funds provider server 200 through respective Internet connections. As should be understood in this art, card issuers are generally banks, but the accounts associated with cards issued by the banks are controlled by other entities, the managers, that maintain the accounts and manage transactions relating to the cards. It should also be understood that funds recipients/repositories may include entities other than card issuers/managers, and thus additional blocks 212 could be shown in FIG. 4 to represent such other entities. Thus, the description of card issuers/managers is solely for purposes of explanation. Each entity in FIG. 4 maintains its own computer systems, which may comprise workstations, servers and/or other computing devices, databases and local networks, independently of the funds network.

Figure 2:
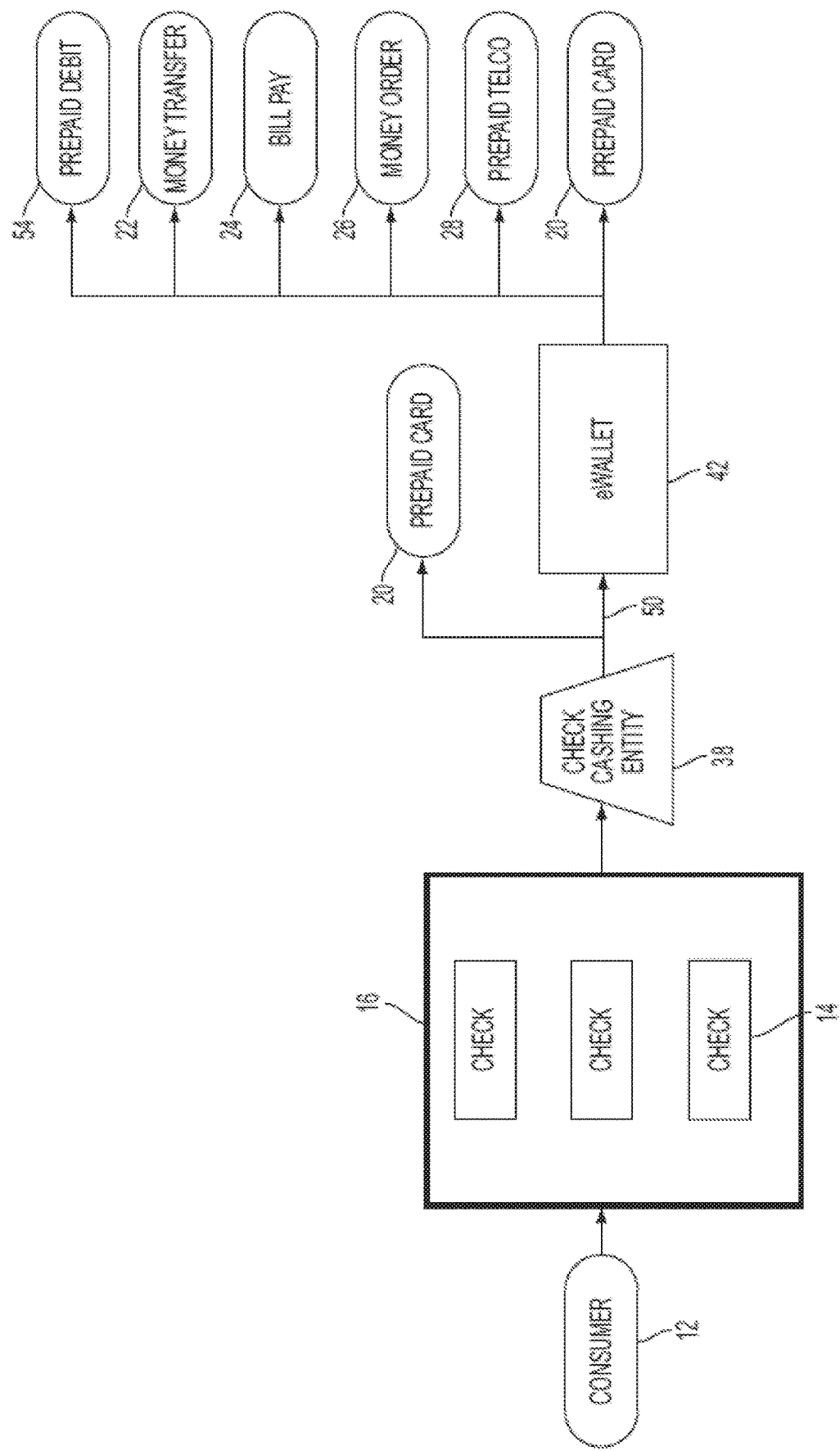
FIG. 2 is a schematic view of a transaction made through an embodiment of the system and method according to the present invention.

Also referring to FIG. 2, a consumer 12 may present one or more checks 14 to funds network 38 via a check cashing entity at 206 or 208 to obtain funds. The consumer is the check payee (who may be a transferee), and the check cashing entity takes possession of the one or more paper checks from the consumer, who requests the check be converted to funds. The check cashing entity forwards to the funds network information that identifies the consumer and the request. Funds network 38 provides funds to a monetary repository as requested by consumer 12, in this example a prepaid card provider who then provides funds to consumer 12 after the funds network validates the check in conjunction with a check cashing guarantor. In one embodiment, and as described in more detail below, funds network 38 validates the check through a check guarantor selected from a plurality of available guarantors according to a predetermined algorithm, and may access a greater amount of relevant data in making the check verification than is practically available to any single guarantor other than the funds network.

As described in more detail below, consumer 12 may present a check to funds network 38 directly (for example through a kiosk 208 or a funds network-operated check cashing service location 206) or indirectly (for example through a retailer-operated service location 206). Assuming the funds network decides to convert the check to value, funds network 38 provides good funds to the prepaid card provider, who then makes the funds available to the consumer through a card. Generally, the consumer endorses the check to the funds network rather than to the check-cashing entity, and the funds network presents the check through a payment processing system for payment with recourse to the funds network. Thus, funds network 38 provides good funds to repository managers, for example prepaid access providers, without the check-cashing entity involved in the settlement loop and without the check-cashing entity, and possibly without the repository manager (where the funds network and the repository manager are separate entities), assuming liability for those funds in the event of returned checks.

Also as described in more detail below, one embodiment of funds network 38 may have access to multiple check guarantors and offers an auction to the guarantors to provide check guarantees. Because the funds network handles and records check transactions from multiple guarantors, funds network 38 may provide a greater breadth of transactional data to a given check guarantor in a given check-cashing transaction than the guarantor would be able to access if the guarantor were handling the transaction independently of the funds network, thereby enhancing the likelihood the check cashing verification decision is correct. In an embodiment in which the funds network aggregates a plurality of guarantors, the funds network 38 may provide a higher probability of approval and/or a lower cost approval by broadening the spectrum of guarantors on any given guarantee request.

In a still further embodiment, funds network 38 may provide an electronic wallet (e-wallet) into which a consumer can direct proceeds from a check and from which the consumer can allocate funds into repositories such prepaid access accounts or service accounts (e.g. for paying invoices to service providers).

Funds network 38 maintains one or more deposit bank accounts in one or more banks or other financial institutions. The funds network maintains a customer record in a table of database 202 of each consumer who has enrolled with the funds network. The customer record indicates whether the consumer has registered with the funds network for an e-wallet. For each such consumer, the database customer record indicates the amount of funds allocated to that consumer's e-wallet, and the funds network maintains a corresponding amount in its bank account(s). The consumer and funds network 38 enter an agreement governing terms and conditions under which funds network 38 maintains the consumer's funds in the e-wallet account and under which the consumer may draw from that account. Alternatively, an entity separate from the load network may own the e-wallet account and operate as described herein based on a contractual arrangement with the load network. When the consumer loads a check through the funds network, the system may automatically direct the proceeds to an e-wallet, if the consumer has an e-wallet account, or the system may provide a query option through which the consumer can request that the proceeds be deposited in the consumer's e-wallet. In that event, when funds network 38 obtains a guarantee on the check, the funds network deposits the proceeds into the funds network e-wallet associated bank account and credits the consumer's record in database 202 accordingly.

More specifically, Assume that the consumer presents a load request to the funds network by swiping a pre-paid card at a kiosk 208 or computing device 206 such that the kiosk or computing device submits the card number to server 200 through an Internet or other network connection. Prior to verifying the check for loading as described above, the funds network checks the card number against a table in database 202 that contains customer records. These customer records include all card numbers associated with consumers enrolled in the funds network and also indicate whether each consumer has registered for an e-wallet. If server 200 determines from the card number received as the load request that the card number is associated with an e-wallet, server 200 identifies the consumer associated with the card in the database table and proceeds through the check verification and cashing procedure described in more detail below. If check-cashing concludes successfully, the funds network loads check proceeds to the consumer's e-wallet account as indicated at 42 in FIG. 2, or possibly another account the consumer may establish in the process.

If the card number is not associated in database 202 with an e-wallet account, server 200 acquires the bank identification number (BIN) from the card number and checks a table in database 202 to determine whether the BIN is associated with a card issuer who has enrolled with the funds network. Alternatively, as the table may be configured to correlate card issuers with the entire card number, so that the table lists all cards of that issuer involved in transactions, the system could locate the customer with the full card number. In either arrangement, server 200 determines whether the card has been issued by an enrolled card issuer. Enrollment represents a prior contractual arrangement between funds network 38 and each participating card issuer that allows funds network 38 to automatically access the card issuer's computerized system and provides for the settlement of funds with the card issuer. If the card is associated with an enrolled card issuer, the funds network proceeds through the check verification process as described in detail below. If the check verification is successful, funds network 38 loads check proceeds to the card, as indicated at 20 in FIG. 2.

Alternatively, funds network 38 may offer the consumer a choice, through a user interface, to allocate proceeds of cashed checks to a prepaid card account (or other prepaid access account) or an e-wallet. For example, prior to verifying the check for loading as described above, the consumer may be prompted (by an automatic screen display driven by a user interface or manually by an operator) to select whether to apply check proceeds into e-wallet 42 or directly onto a prepaid card or other prepaid access account at 20. If the consumer elects to deposit funds in a prepaid card or other prepaid account, the consumer may select that option through the user interface at a kiosk 208 or may inform the service provider operator who, in turn, communicates the choice to funds network server 200 via the operator's terminal. If the consumer selects the e-wallet, the funds network acquires the consumer's prepaid card number and locates the consumer's e-wallet account, as described above. If the consumer selects the prepaid card, the system acquires the card number and determines whether the card issuer is enrolled in the funds network, as discussed above.

Whether selection between the prepaid card account and e-wallet is automatic or through an interface, and as described in more detail below, the funds network then proceeds to acquire data and verify the check. Assuming the check is verified, the funds network allocates check proceeds to the card or the e-wallet.

The consumer may later wish to allocate funds from the e-wallet to various repositories. To do so, the consumer accesses server 200 via a username/password log-in procedure (or by swiping a card issued by a prepaid card provider enrolled in the funds network, biometric data or other security mechanism) on a funds network kiosk 208 or a consumer mobile or other computing device 206 that connects directly with server 200 through an Internet connection by requesting a uniform resource locator (URL) associated with server 200 through an Internet web browser that is located on the consumer's computing device. The consumer may access the funds network server in various ways, for example a WAP-enabled device. In response to access by consumer 12, a computer program executed by server 200 presents the consumer with the user interface on the consumer's computing device, and the user interface provides the consumer the choice between executing a load transaction and accessing the consumer's e-wallet account. Alternatively, if the consumer is already in communication with server 200 through such a connection for conducting a load transaction as described herein, the consumer may simply select an e-wallet allocation option instead of or after the funds load function, thereby changing to allocation mode. Once in e-wallet allocation mode, server 200 presents the consumer with a screen identifying the consumer's e-wallet balance and prompting the consumer for instructions regarding allocation of e-wallet funds. The user interface presents a list of prepaid cards associated with the consumer database 202, along with a list of other monetary repository providers enrolled in the funds network and, possibly, associated with the consumer. Through the user interface, consumer presents an instruction to server 200 to allocate funds from the consumer's e-wallet account to the consumer's desired repository.

Assume, for example, that the consumer selects a prepaid card 20. The user interface then prompts the consumer to enter a desired amount to allocate from the e-wallet to the card. After the funds network receives the instructions, it effects a funds transfer of the requested amount to the account manager associated with the card, and the card account manager credits the consumer's prepaid account by that amount, less any fees assessed by the card issuer. The funds network may also debit a fee for the funds network as disclosed in the terms and conditions of an agreement between the funds network and the consumer. The network transfers the moneys owed to the prepaid card issuer at an agreed upon settlement date in the future via electronic transfer.

Through the user interface, consumer 12 may provide instructions to server 200 to allocate some or all of the funds in the consumer's e-wallet to other monetary repositories controlled by managers that have contracted with the funds network to allow the funds network to load funds to their accounts, and the consumer may select such other repositories through the server 200 user interface. For example, the user interface may provide the consumer the option to allocate funds from e-wallet 42 to a money transfer at 22. After selection of this option through the user interface, the user interface prompts consumer 12 to identify the money transfer service provider (e.g. WESTERN UNION), the recipient, and the amount of the proceeds to be directed to the money transfer account. Funds network 38 has a preexisting contractual relationship with the service provider under which the funds network feeds the service provider's application program interface (API) to the consumer's computing device and through which the consumer requests the money transfer. Pursuant to the agreement between the funds network and the money transfer service provider, a settlement process debits an account associated with the funds provider and credits the debited amount to an account owned by the money transfer service provider through an automated clearing house or other electronic transaction on a predetermined settlement date. Also pursuant to such agreement, the API preferably reports to the funds network the transferred amount.

Similarly through the user interface, consumer 12 may allocate funds from e-wallet 42 to an automatic bill paying account, such as provided by services such as PAYPAL at 24, a money order at 26, a prepaid telephone card at 28, or other desired monetary repository.

In the presently-described embodiment, the funds network charges fees on funds loaded to monetary repositories that are set by an agreement between the funds network and the repository manager. The repository manager therefore knows the fees that are ultimately borne by the consumer based on the funds network, and may therefore consider that information in setting its own fees. Of course, in a situation in which the funds network is also the repository manager, the funds network can control fees related both to the funds network function and the repository function.

In one preferred embodiment, funds network 38 requires that all proceeds of a cashed check be submitted to the funds network, without retention of a partial amount for distribution to the consumer in currency. However, after allocating the entire check proceeds to a prepaid card at 20 and/or an e-wallet at 42, server 200 may prompt the consumer (directly through a user interface if the consumer is communicating directly with the funds network through a funds network kiosk 208, or indirectly via an operator if the consumer is communicating with the funds network through a manually operated check-cashing entity) to request whether the consumer desires to receive currency in a cash-back transaction. If the consumer replies in the affirmative and identifies a source for the funds (e.g. a prepaid card or e-wallet account), server 200 instructs kiosk 208 to dispense that amount of cash to the consumer in currency, or instructs the service provider operator to do so. In the former situation, the load network charges the dispensed amount against an internal account and, if the consumer designated the funds be charged against a prepaid account, later settles the amount with the prepaid account manager by electronic funds transfer. If the consumer designated withdrawal from an e-wallet account, the load network settles the amount with the e-wallet account internally or, if the e-wallet account is managed by a third party, with the third party manager. In the latter case, the service provider later settles the dispensed amount from funds network 38, and funds network 38 then settles with the source of the cash-back funds. Alternatively, and particularly where the service provider is a retailer, the consumer may not have a cash back option. In a still further embodiment, load network 38 loads funds directly into prepaid or other repositories 22, 24, 26, 28 and/or 54, without an intervening e-wallet 42.

FIGS. 3A-3G illustrate one embodiment of a transaction employing a system as described above. In operation of funds network 38 (FIGS. 2 and 4), and referring to FIG. 2 and FIG. 3A, a consumer 12 presents one or more checks 14 to the funds network, for example at a retail establishment, or stand-alone service provider 206, or kiosk 208 (FIG. 4), at 55. The kiosk, retailer or service provider obtains consumer identification information at the kiosk 208 or retailer/service provider computer 206, for example by prompting the consumer or operator to swipe a prepaid card associated with an enrolled card issuer or enter the card number by other means.

Figure 3A:
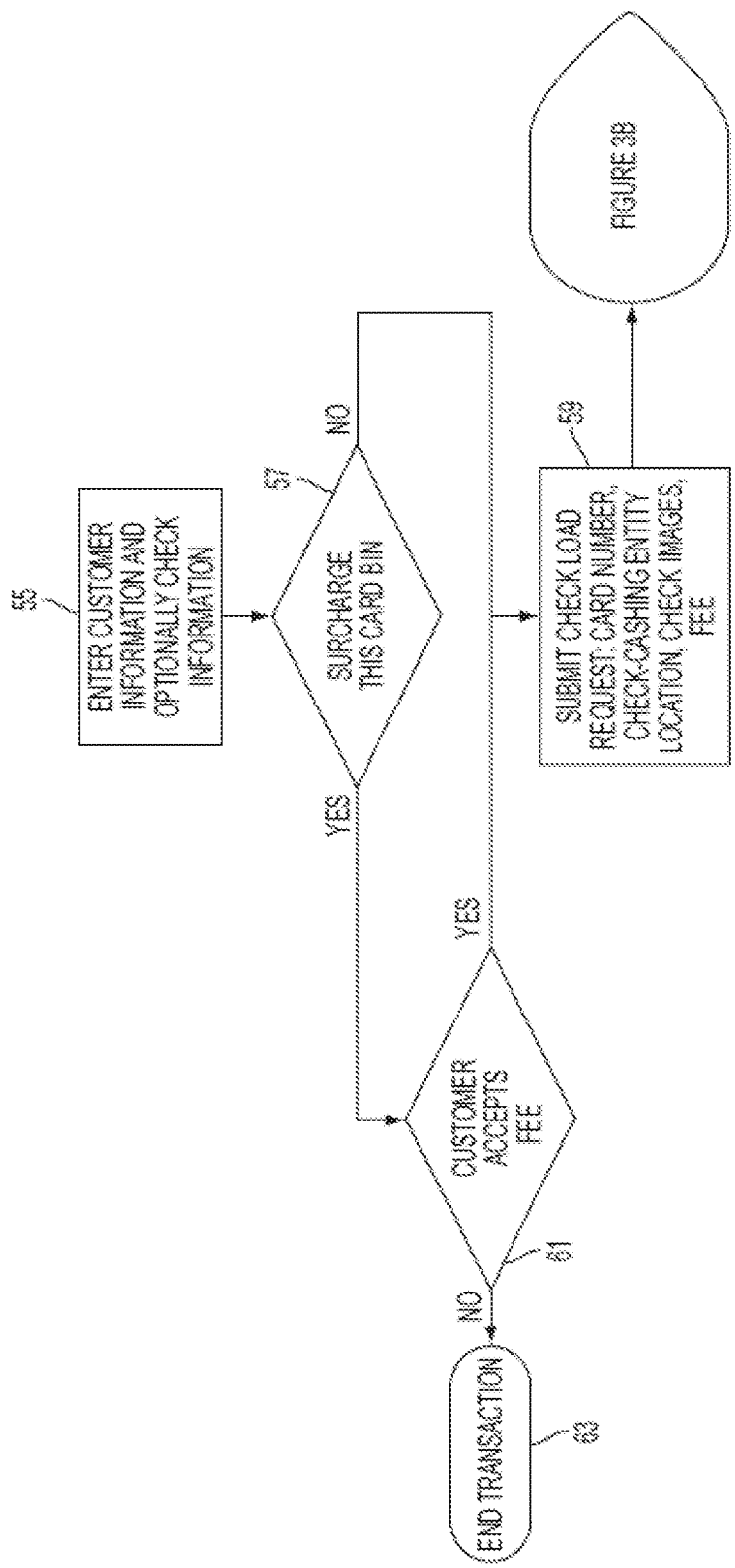
FIGS. 3A-3G are a partial flow diagram view of a method according to an embodiment of the present invention.

The retailer, service provider or kiosk may charge service fees for cashing the consumer's checks. This is controlled by the service provider systems independently of funds network 38. For example, the retailer or service provider may have a policy to always charge a certain fee for cashing a check. If so, when the customer information is entered into the service provider's computer system at 55 as part of a check cashing transaction, the service provider's computer system may automatically associate such fee amount with the customer identification data. Other arrangements are possible, however, and the check cashing entity may selectively waive the fee in its sole discretion. Thus, for example, as shown in FIG. 3A, if the consumer enters customer information into the check cashing entity's system at 55 in the form of a prepaid debit card number, the check cashing entity's system acquires the BIN from the card number and checks at 57 whether the card issuer associated with the BIN is one with which the check-cashing entity has a retail or other commercial relationship such that the check-cashing entity waives the transaction fee. If so, then at 59, the check cashing entity passes the consumer identification information to funds network 38 without the check-cashing entity surcharge.

However, if at 57 the customer identification information is not a card number associated with a card issuer with which the check cashing entity has such a relationship, then at 61 the check cashing entity may present a question to the consumer, requesting the consumer to confirm whether the consumer agrees to the charge of a fee for the check cashing service. If the consumer does not agree, the transaction ends at 63. If the consumer wishes to accept the additional fee at 61, then at 59 the check cashing entity includes the fee amount with the data passed up to funds network 38.

Note that in the example, the consumer identification information is acquired at 55 by the check cashing entity system, not the funds network system. Pursuant to a prior arrangement between the funds network system and the check cashing entity, the check cashing entity may configure its system to request and acquire certain predetermined customer identity information that the check cashing entity then forwards to funds network 38. The check cashing entity merely acquires this information; it does not analyze or utilize the information to actually identify the consumer. For example, where customer identification information comprises biometric data, the check cashing entity system may acquire the biometric data to pass to funds network 38, but it does not analyze the data to identify the consumer. Similarly, where the identification information is a user name and personal identification number (PIN) sequence, the check cashing entity may present such questions to the consumer, receive the consumer's responses, and forward the responses to the funds network 38, but the check cashing entity does not identify the consumer based on those responses. Where the customer identification information is a prepaid debit card number, whether acquired from a magnetic card swipe or keyed entry, the check cashing entity passes the card number to the funds network without associating the card number with a consumer identity.

As described in more detail below, the check cashing entity may also acquire at 55 an image of the check, for example via a scanner located at computing device 206. The check-cashing entity prompts the consumer to endorse the check to the funds network, either by a special endorsement (i.e. endorsement to the person, corporation, partnership, or other entity that controls operation of the funds network) or by a blank or general endorsement coupled with subsequent transfer of the instrument or corresponding funds to the funds network. From step 59, computer 206 or 208 communicates the identification, endorsed check image (if present) and fee (if present) information to server 200 over Internet connection 210. In another embodiment, the imaged check may be passed to the funds network without endorsement, and the funds network prompts the check-cashing entity to acquire the endorsed check after check verification. In such arrangement, the check-cashing entity would confirm receipt of endorsement and so notify the funds network before the funds network submits a load instruction to the card account manager. The timing of the endorsement can vary, but in a preferred embodiment, the agreement between the funds network and the check-cashing entity requires the check-cashing entity to confirm the consumer has endorsed the check and take possession of the endorsed check before some predetermined event or action occurs. For instance, the agreement may obligate the check-cashing entity to take possession of the endorsed check before imaging the check and forwarding the image to the funds network, so that the funds network interprets receipt of the imaged check as confirmation that the check has been endorsed to the funds network.

Figure 3B:
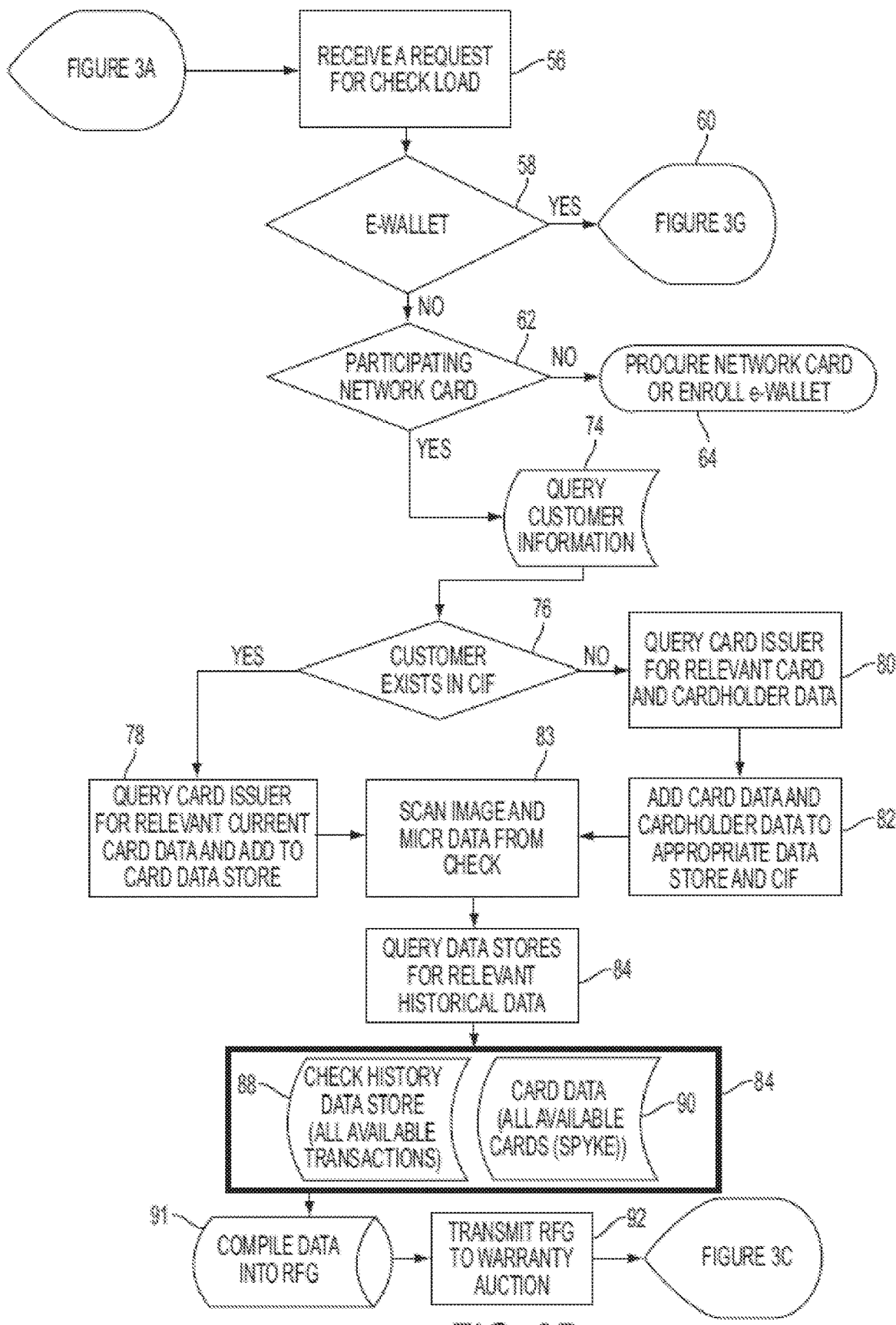

Referring to FIG. 3B, funds network 38 receives a check load request at 56. The check load request may comprise any format sufficient to notify the funds network that a request has been received. In one presently-described embodiment, the load request is simply the receipt of a reloadable debit card number from the check-cashing entity at 59 (FIG. 3A). Upon receiving the card number, server 200 checks a table in database 202 that associates card numbers with e-wallet accounts, at 58. If the card number is not associated with an e-wallet account at 58, server 200 acquires the BIN from the received card number and checks a second table in database 202 (or, possibly the same table, depending on the data arrangement) that associates BIN's with card issuers and identifies whether the card issuer is presently enrolled with the funds network. If the card issuer is not enrolled with the funds network, server 200 reports this information back to the check-cashing entity over Internet connection 210 and prompts the check-cashing entity to so notify the consumer and recommend to the consumer enrollment with the funds network, at 64, and the transaction ends.

If, however, the card's BIN indicates that the card is enrolled with the funds network, then at 74, server 200 queries the card account manager for the card issuer associated with that BIN number via an application programming interface (API) established pursuant to the enrollment agreement between the card issuer and the funds network. As should be understood, the API may reside locally with the funds network or remotely at the card issuer system or a third-party data center. The arrangement of the API, or generally the mechanism of communication between the funds network and the card issuer, are not in-and-of-themselves part of the present invention and thus not discussed in further detail herein.

In the embodiment described with respect to FIG. 3B, the query at 74 asks only for the identity of the consumer associated with the card number received from the check-cashing entity, for example causing the card account manager to return the consumer's Social Security Number or other predetermined identification indicia via the API. In another embodiment, however, the card account manager returns additional cardholder data, for example the consumer's name, address, city, state, zip code, Social Security Number, tax identification number, or other similar information. Furthermore, the card issuer may also return data relating to the card, for example card status (e.g. open or closed, active or inactive), card issue date, present balance, load limit (i.e. the maximum load allowable), and whether the card is associated with a direct deposit account.

At 76, server 200 checks a table in database 202 that associates the predetermined customer identification information (for example, Social Security Number) with enrollment of individuals associated with that type of identification in the funds network. The table preferably includes customer information, such as name, city, state, zip code, Social Security Number, tax identification number, and similar information. Thus, if the customer identification is present in the table at 76, there is no need for further cardholder data from the card issuer. If the funds network did not acquire current card data at 74, server 200 makes a second query to the card account manager at 78 through the API associated with the card issuer and requests the card data associated with the card number passed from the check-cashing entity at 59 (FIG. 3A). Server 200 adds a record for this card number to a card data table maintained at database 202 that includes the card data as described herein. If the server acquired the card data at 74, however, the query portion of step 78 may be omitted, and server 200 saves the card data record directly from that previously obtained data.

If, at 76, the customer is not present in the customer table of database 202, and if server 200 did not query the card issuer at 74 for cardholder data and card data, then at 80, server 200 queries the card issuer through the API for both types of data. Upon receipt of this information, server 200 creates a corresponding card data record, and a corresponding cardholder data record, in the card data table and customer table on database 202, at 82. If the server acquired the cardholder and card data from the query at 74, step 80 may be omitted and this data directly stored at step 82.

At 83, server 200 sends a request through Internet connection 210 to the check-cashing entity that provided the card number at 59, requesting that the check-cashing entity provide an image of the underlying check or checks involved in the load transaction, endorsed by the consumer. This prompts the check-cashing entity to request the consumer to endorse the check to the funds network and to acquire a check image, for example by scanning the endorsed check at computer 206. Server 200 awaits the returned image of the endorsed check. In another embodiment, the check-cashing entity may acquire the endorsed check image initially, so that the check-cashing entity passes the check image along with the card number as part of the check load request from 59. In that event, step 83 may be omitted. As noted above, the consumer may endorse the check to the funds network by a special endorsement (e.g. "pay to the order of [the funds network]") or by simply endorsing the check with the consumer's signature. The funds network may acquire possession of the check via the Check 21 procedure as discussed below, and/or may acquire possession of the funds corresponding to the check.

Whether obtaining the check image from step 59 or step 83, at 84 server 200 examines the image and acquires the maker identification from the magnetic ink character recognition (MICR) data in the image. At 88, server 200 checks a transaction record table of database 202. Each record of this table, for example, includes maker identification, check type, check amount, transaction date, payee (consumer) identification, load recipient (i.e. card issuer), and transaction result (for example check cashed or not, check cleared or not, and/or load successful or unsuccessful) for a past load transaction. In the presently-described embodiments, database 202 includes transaction records for all past transactions conducted through the system in which a negotiable instrument was requested to be converted to funds, for instance for all makers and all payees. Server 200 retrieves at 88 all such records listing the maker identified at 84. At 90, server 200 retrieves from this table all such records listing as payee the consumer identified at 74. Thus, the server retrieves all transaction records stored in database 202 for the maker involved in the present transaction, regardless of consumer, and all transaction records available in the database involving the consumer, regardless of maker or card issuer.

Server 200 compiles the transaction data retrieved at 88 and 90 into a request for guarantee at 91 and transmits the compiled data in an auction request to one or more check guarantor entities 94, at 92.

Figure 3C:
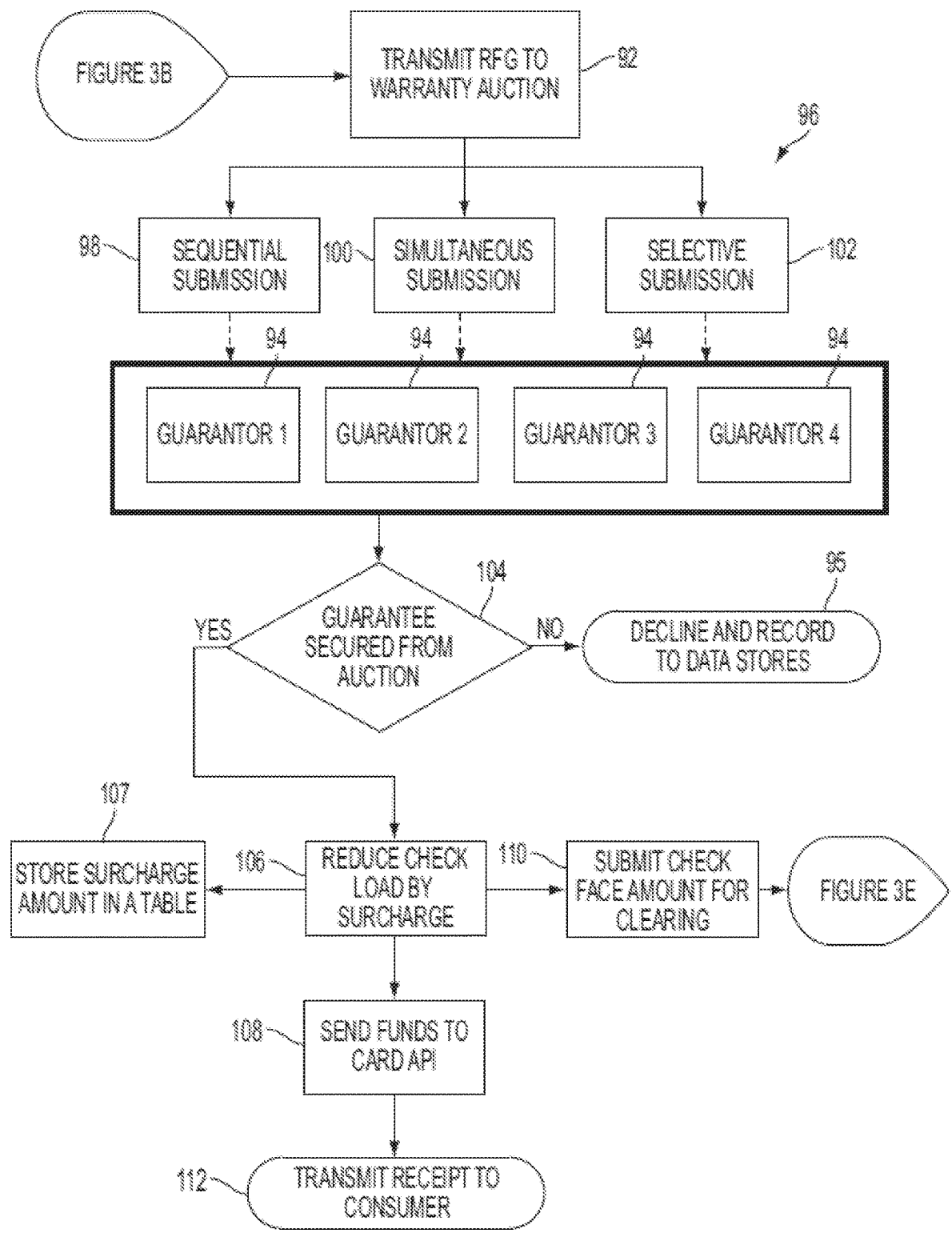

Referring also to FIG. 3C, as indicated at 96, the sequence by which the auction offer can be transmitted/offered to the plurality of check guarantors 94 can vary. In a sequence indicated at 98, for example, the load network transmits the offer sequentially, asking first one, and then a next, guarantor entity 94 until a guarantor accepts the offer. The order in which guarantors are queried may be established in various ways, e.g. by a randomly generated sequence or by a predetermined order in which slots in the order are reserved by the guarantors in the enrollment process with the funds network.

Figure 3D:
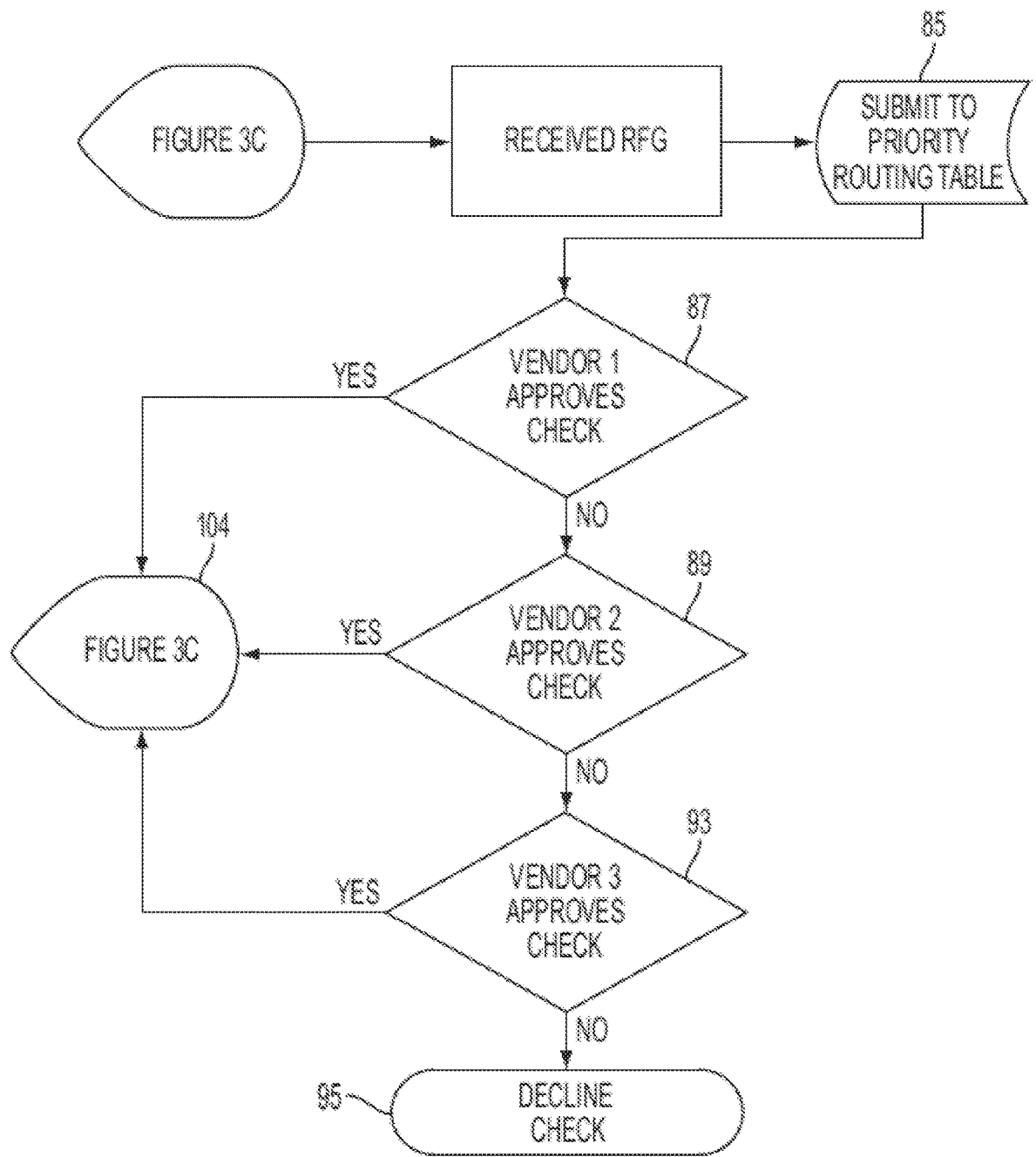

Referring to the detail of procedure 98 at FIG. 3D, server 200 checks a table in database 202 at 85 to determine the first guarantor 94 to which to submit the request for guarantee. Server 200 submits the request electronically over a network connection to the first check cashing guarantor 94 indicated at 85, pursuant to a pre-existing agreement between the guarantor and the funds network enrolling the guarantor with the funds network. If the first vendor identified at 85 accepts the request, and agrees to guarantee the check, at 87, the check guarantee process is concluded at 104. If the first check cashing guarantor 94 does not accept the request, or does not approve the check, at 87, server 200 submits the request to the next check cashing guarantor indicated at 85, at 89, again pursuant to an enrollment contract. If this guarantor accepts the request and agrees to guarantee the check, the check cashing guarantee procedure ends at 104. If not, server 200 submits the request sequentially to the check cashing guarantors in the order identified at step 85, repeating the process until either a check cashing guarantor guarantees the check, thereby advancing the process to step 104, or all check cashing guarantors either refuse the process and/or reject the check at 93. In the latter event, the customer is notified via the check-cashing entity at computers 206 or 208 at 95 that the check has been declined. Server 200 stores a data record reflecting the transaction (e.g. check maker, check type, check amount, and result) in the transaction record table of database 202, and the process terminates.

Returning to FIG. 3C, in a sequence indicated at 100, the funds network simultaneously submits the auction request to all guarantors 94 enrolled with the funds network, selecting the first guarantor 94 to accept the offer. In a sequence indicated at 102, the load network selects a guarantor 94 in an order based upon a predetermined criterion or criteria, selecting the first guarantor 94 to accept the offer. The criterion or criteria can vary as desired and is not, in and of itself, a part of the present invention. For example, the server may select guarantors based on fees, going first to guarantors with lower fees, and/or transaction-based criteria, such as whether guarantors have preferences for transaction amount ranges or check types.

As should be understood in the check-cashing art, the check guarantor analyzes the check data and the customer data and makes a decision whether to guarantee the check. If, at 104, the selected check guarantor 94 transmits to the load network 38 an approval to cash the check, the funds network deducts the check cashing entity's fee (if any) received from 59 (FIG. 3A) and an interchange fee (described below) from the check proceeds at 106, credits a funds network-owned account by the fee and interchange amounts, and records the fee and interchange amounts in a table at 107. The funds network immediately transmits instructions to the card issuer identified from the card data received from 59 to load the customer's account associated with the card with the remaining check proceeds, at 108. Funds network 38 provides these instructions via an API pursuant to an enrollment agreement between the funds network and the card issuer. In this instruction, the funds network identifies the consumer, the card number, and the load amount. From its local accounts, the card issuer deposits funds equal to the load amount into an account associated with the card number. From the card issuer's perspective, the funds network is liable to the card issuer for the funds, regardless of the underlying check's validity. Typically, although not necessarily, the funds network and the guarantor 94 that guarantees the check have an agreement under which the guarantor assumes the risk of loss if the check is returned. The funds network transmits a receipt to the customer via the check-cashing entity and computer 206 or 208, at 112.

Alternatively, the funds network may transfer funds to the card account manager at step 108, rather than sending instructions. In that event, the funds network would not transfer funds to the card account manager at step 127 (described below), and that step can be replaced by a step of applying check proceeds to a funds network account, if the check clears. Moreover, in the procedure described with respect to FIGS. 3F and 3G, the funds network initially deposits the check into a funds network account, submits the check for settlement, and forwards fees to the card manager, whereas in the procedure described below with regard to the FIGS. 13 and 14, the funds network initially deposits the check in an account owned and controlled by the issuing bank, which submits the check for settlement and transfers fees to the card manager and ultimately the funds network. It should be understood that either approach may be utilized with either of the check conversion procedures described with respect to FIG. 3 or 8-12.

Figure 3E:
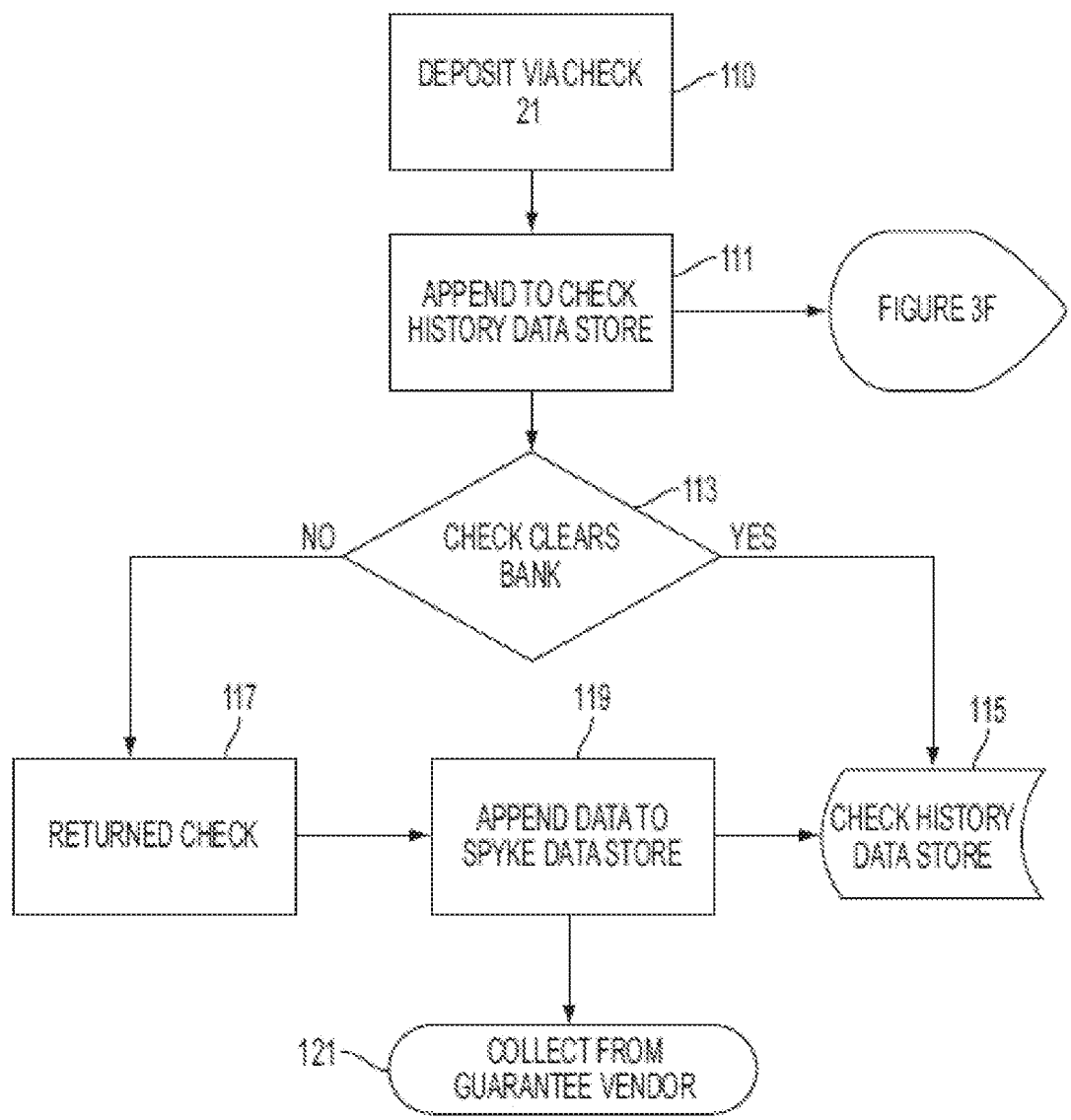

At 110, and also referring to FIG. 3E, the funds network deposits the face amount of the underlying check (i.e. the amount for which the check was made, without reduction for any fees) in a funds network fiduciary account at a clearing bank, and electronically transmits a copy of the image of the check for settlement via the Check 21 protocol to the clearing bank. At 111, the funds network adds a data record to the transaction record table at database 202, recording the consumer identity, maker identity, check number, check type, check amount, check-cashing entity identification, date, interchange and check-cashing entity fees, and the identity of the card issuer receiving load. As should be understood, under the Check 21 protocol, a substitute check, or image replacement document, is created by or for the funds network. As should also be understood, the Check 21 settlement procedure requires that a check be cleared within a two day period. If the check clears at 113, then at 115, the funds network updates the transaction record for this check in the transaction record table at database 202, and this part of the process ends. The check maker's bank forwards the check face amount to the clearing back noted above. In turn, the clearing bank forwards the check face amount to an account designated by the funds network. The funds network distributes the check proceeds as described in more detail below.

If the check does not clear at 113, the clearing bank receives notice of the returned check at 117. The clearing bank notifies the funds network of the returned check, and the funds network appends the returned check notice to a table in database 202 that holds information relating to returned checks, at 119, and updates the check's transaction record in database 202 to indicate a returned check, at 115. At 121, pursuant to an agreement between the funds network and the check guarantor that guarantees the check, the funds network provides notice to the check guarantor, for example automatically through an API established pursuant to the enrollment agreement, that the check was returned and requesting that the guarantor indemnify the funds network for the check face amount. In response, the check guarantor transfers, for example by electronic funds transfer or automated clearing house transfer, the face amount of the check to an account designated by the funds network.

In another embodiment, the funds network does not present the check transaction to a guarantor selection procedure, but instead accepts the liability within the funds network alone. In that instance, and returning to FIG. 3B, the funds network acquires the information from step 84 and makes its own assessment whether to approve the check. In this instance, the funds network computer system receives confirmation to fund the check from the funds network entity as part of the entity's internal operation. Thus, and referring to FIG. 3C, the funds network's decision is reflected at step 104, and the process proceeds from that point as discussed above, except that in the event the check is returned at step 113 (FIG. 3E), step 121 is omitted, and loss on the check remains with the funds network.

Figure 3F:
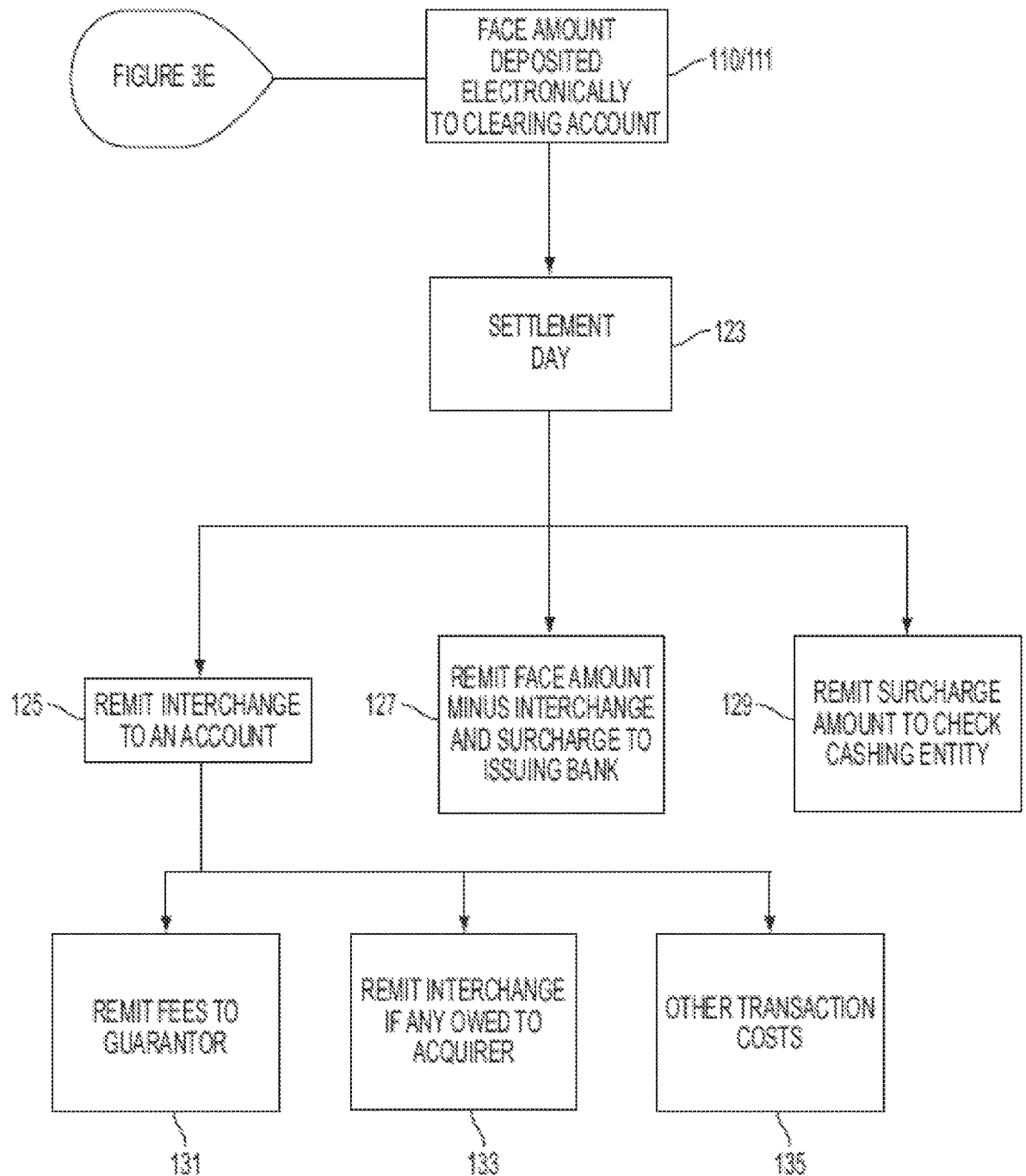

Regardless whether the check clears, and referring to FIG. 3F, after the check is submitted for settlement at steps 110-111, the funds network pauses for a predetermined period of time, for example two business days, to permit the check to clear and funds to be returned from the check, as indicated at 123. After the pause, and again regardless whether the underlying check clears, the funds network allocates the total face amount according to the steps indicated at 125, 127, and 129. At 125, the funds network allocates the interchange fee to the funds network. This is an accounting remittance and does not necessarily involve an actual transfer of funds, although it is possible to move funds between funds network accounts for this purpose.

The interchange is a fee established by agreement between the funds network and the card issuer to which the load amount is sent at 108 (FIG. 3C). The interchange can be established in any manner agreeable between the parties, but in this example is set as a percentage of the check face amount, for example 3%. Thus, at step 127, 3% of the check face value is allocated to the interchange. The interchange may also be referred to herein as the funds network fee.

At step 129, the initial fee charged by the check-cashing entity and reported to the funds network from 59 (FIG. 3A), if any, is transferred by the funds network, for example by electronic funds transfer or automated clearing house transfer, from a funds network account to the check cashing entity. At 127, the remainder (i.e. the check face value, less the interchange and the check-cashing entity fee) is transferred by the funds network from a funds network account to the card issuer.

At 131, 133 and 135, the funds network allocates a portion of the interchange to costs associated with the transaction. For instance, if the funds network obtains a guarantee of the check from a check guarantor 94, there will generally be a per-transaction fee owed by the funds network to the check guarantor pursuant to an agreement between those parties. The funds network therefore transfers this fee at 131 from a funds network account to the check guarantor. Similarly, the funds network and the check-cashing entity may have an agreement under which the funds network remits to the check-cashing entity a per-transaction fee. This fee is independent of fees that the check-cashing entity may charge the consumer as shown in FIG. 3A. At 133, the funds network transfers this fee amount from a funds network account to the check-cashing entity. Moreover, as should be understood in the art of settlement transactions, there are costs associated with the settlement process, and the funds network may transfer funds from a funds network account at 133 to pay these costs. The difference between the interchange fee and the sum of the fees and costs paid at step 131, 133 and 135 represents the per-transaction net revenue to the funds network.

Figure 3G:
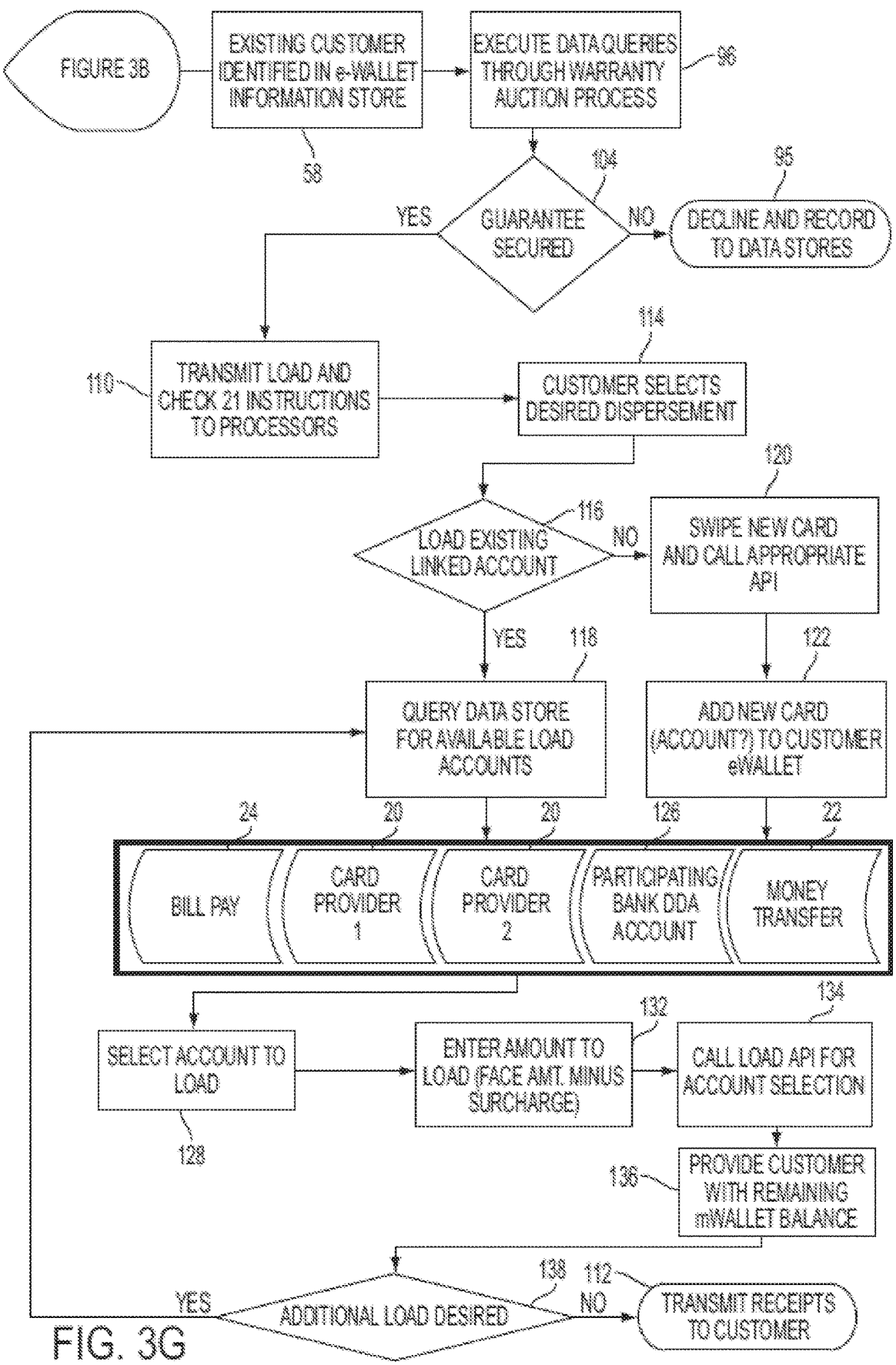

Referring now to FIG. 3G, if the check load request from step 56 indicates at 58 (FIG. 3B) that the customer has an e-wallet account with the funds network, then steps 62 through 74 in FIG. 3B are unnecessary, and the answer to step 76 is "yes." Accordingly, server 200 executes steps 78-135 as discussed above with respect to FIGS. 3B-3D, 3E, and 3F, except that step 108 changes to transfer of funds to the funds network's e-wallet associated account and an update of the consumer's record in the funds network database to reflect the increased e-wallet balance, and that settlement at step 127 is to the funds network e-wallet account. If a check-cashing guarantee is not obtained at 104, the transactions ends, and the data store is updated, at 95, as discussed above. If, however, a check guarantee is obtained at 104, the load network submits the check for processing and settlement at 110 (FIG. 3C). At step 127 (FIG. 3F), server 200 (FIG. 4) allocates to the customer's e-wallet account identified at 58 the check proceeds, less the interchange and check-cashing entity independent fee.

If the consumer wishes, at this or a later time, to withdraw funds in the e-wallet account (whether maintained by the funds network or a third party), the consumer may access the account through the funds network or third party independently of the load and allocation functions discussed herein. If, however, the consumer wishes to allocate funds from the e-wallet to a monetary repository maintained by a manager enrolled with the funds network to receive good funds, the consumer may access funds network server 200 directly via a funds-network owned kiosk 208 or a consumer-controlled computer 206 (FIG. 4), such as a mobile telephone with a suitable application, at 114. Alternatively, if the consumer executed a load transaction discussed above via a direct connection with the load network over such a device, the consumer may execute an option through the funds network user interface to move from loading mode to allocation mode, as indicated by the line between 110 and 111 in FIG. 3G. Upon accessing the funds network through such a connection and indicating a desire to disburse funds from the e-wallet at 114, server 200 presents to the consumer (via a user interface presented at the consumer's computing device) a query whether the consumer wishes to disburse funds from its e-wallet account to an existing monetary repository associated in a table of database 202 with that e-wallet account, at 116. If the consumer indicates at 116 that the consumer does not wish to load e-wallet funds to an existing repository, server 200 prompts the consumer or operator to enter information identifying the new repository. In response to the prompt, for example, the consumer or operator swipes or otherwise identifies or images a new card at the computer 206 or 208, or other computing device, at 120. If the BIN portion of the new card number does not match an enrolled card issuer, the transaction ends, as at 95. If the BIN does match a card issuer, then at 120 server 200 queries the card issuer via the API associated with that issuer, obtains card data, and creates a record in the database table, associating the new card with the e-wallet account, at 122.

If the customer indicates that it wishes to disburse funds from the e-wallet account to an existing repository at 116, server 200 queries database 202 to identify from the database table those customer-associated repositories that are available to this particular customer. For example, the particular consumer may have set up an account to enable the consumer to pay utility or other personal bills, and/or an account by which the consumer may make money transfers 22, and/or two reloadable debit cards 20. If the consumer has a direct deposit bank account, the customer may also disburse funds from its e-wallet account to the direct deposit bank account, as indicated at 126.

Having identified the available consumer-associated accounts at 124, server 200 presents via the user interface a selection window through which the customer selects the desired customer-associated account or other repository, at 128. Server 200 then queries the consumer via the user interface to enter the amount of the desired disbursement. The consumer enters this information to server 200 via computer 206 or 208 or other computing device at 132. If the requested load amount is within the amount present in the e-wallet account, the requested load amount is accepted, and a fee charged by the funds network pursuant to the e-wallet or, alternatively, is allocated in addition to the load amount agreement between the funds network and the consumer is deducted from the requested load amount. At 134, the funds network debits its (or requests a debit of the third party) e-wallet account by the load amount and the fee, and the funds network sends a load request to the requested customer-associated account or repository, as at step 108 (FIG. 3C). Pursuant to the contract between the load network and the repository manager, the load amount is settled between an account owned by the load network and an account owned by the account manager in due course. The fee is settled from the e-wallet account to a funds network account. At 136, server 200 notifies the customer via the user interface of the remaining balance in the e-wallet account.

At 138, server 200 queries the customer via the user interface whether an additional load is desired. If the customer responds in the negative, server 200 transmits to the customer via the user interface a receipt for the transaction, at 112. If the customer desires another load transaction at 138, the procedure returns to step 118.

FIGS. 5-14 illustrate further embodiments of a system for acquiring and converting negotiable instruments to funds. The embodiments are particularly described in the context of negotiable instrument capture via a device 208 remote from a human operator, but it should be understood that other aspects of the embodiments, for example the load and settlement process, and the use of selectable deposit types and/or selectable fees, may be used in the context of negotiable instruments acquired at manned facilities as well.

In the embodiments described above with respect to FIG. 3, the payee primarily presents a negotiable instrument to the acquirer in person, manually transferring the physical instrument to the acquirer. As noted above, however, the system may acquire the instrument via a device (such as a mobile telephone, kiosk, or automated teller machine) that is remote from the acquirer's human operators. The methods illustrated by FIGS. 5-14 particularly facilitate a negotiable instrument's acquisition via a device that is geographically remote from the acquirer human operators (in that the human operators do not interact with the payee in person), and the instrument's subsequent processing.

In this regard, where the funds network and/or a reloadable card manager charge transaction fees that depend upon the negotiable instrument's classification to one of a plurality of types of maker, that may therefore require human examination of the instrument to determine the type, the methods described below include an initial transmission of an image of the instrument to the funds network. The funds network classifies the instrument according to maker type (e.g. insurance checks, personal checks, government checks, pay roll checks, etc.), determines an applicable fee based on the classification, and returns a fee query to the remote payee. Fees may vary by maker, for example, because the frequency of fraud can vary with maker, as can the level of steps taken to prevent fraud. Through the user interface on the remote device, the payee may accept the fee, thereby continuing the transaction, or refuse the fee, thereby ending the transaction. Where the user interface on the remote device is an application controlled by a reloadable card manager, the card manager can directly control a portion of the fee amount attributable to the card manager on a real time basis.

Second, a given process for converting a negotiable instrument to funds may, depending on circumstances, call for holding the instrument for a period of time in which it is expected that the instrument would complete the settlement process, before converting the instrument to funds. In such circumstances, the method described with regard to FIGS. 5-14 allows the payee to submit the instrument to the funds network from the remote location but delay the instrument's conversion to funds until completion of such period.

It should be understood that the one or more embodiments described with respect to FIGS. 5-14 are implemented at least partially as and/or using computer programs for use with a computer system such as shown at FIG. 4 and described herein. That system's computers, program, and databases effect the various functions of these embodiments (e.g. as reflected in the flow diagrams discussed below), and it should be understood, moreover, that the computer programs can be contained on a variety of computer-readable media, as discussed above with regard to the embodiments of FIG. 3. Client computer systems (e.g. automated teller machines, kiosks, and/or mobile telephones) 208 (FIG. 4) as described herein include user interfaces that enable network communications with other systems, e.g. funds network server 200, over the network as discussed above.

FIGS. 5-14 illustrate flow diagram views of methods for converting negotiable instruments to funds according to various embodiments of the present invention. Each of these Figures illustrates "swimlanes" that describe activities of respective devices or entities within or utilizing the network of FIG. 4. The column headings, however, are generally functional rather than entity-specific, and the present discussion therefore generally identifies the device or entity that performs a function identified by a given swimlane step. It should be understood, however, that the specific allocations of functions disclosed below is provided for purposes of example only and that other devices or entities in other columns or swimlanes could perform given steps in certain circumstances or embodiments. As illustrated, the swimlane column headings are "Customer," "Interface with Customer," "Funds Network," "Third Party Check 21 Processor," "Issuing Bank," and "Card Processor/Program Manager," each of which is discussed below.

As discussed in these Figures, the funds network performs various functions and/or steps involved in processing a check presented by a payee (the term "payee" should be understood to encompass an original payee or a later transferee/holder in due course). The funds network is embodied by one or more computer servers and databases, such as the computer servers 200 and databases 202 of FIG. 4. The funds network may be comprised of multiple servers and databases, whether located locally and networked through a local area network or distributed through a wide area network or an Internet connection. In general, the funds network performs the functions identified in the "Funds Network" swimlanes, but it should be understood that some functions are performed by the card manager server or the Check 21 processor, as may be indicated in the discussion below.

The "customer" is the negotiable instrument payee. The "customer" swimlane generally illustrates functions performed by the payee, for example using a graphical user interface embodied by computer software that is located and operates on a mobile telephone, ATM, kiosk or other mobile or remote device 208 (FIG. 4) to visually present the interface to the payee, although other entities, for instance the card manager, may perform some functions as may be indicated in the discussion below. The customer interface allows the payee to enter and receive information to and from one or more entities involved in the transaction. For example, the customer interface may be a graphical user interface on an ATM, mobile telephone, or kiosk that allows the payee to input customer information and interactively respond to requests made by such other entities. The "Interface with Customer" swimlane generally includes functions performed by the device interface or the card manager, but may encompass functions performed by other entities.

In general, it is not necessary that the entity that owns and/or controls the operation of the device 208 also provide the user interface on that device. A reloadable debit card manager entity, e.g. GreenDot® or H & R Block®, may own and place an ATM or kiosk, and also create and load the user interface, but it is also possible that the card manager creates a user interface that is used on or accessed by an ATM or kiosk owned and operated by another party. Further, in certain embodiments in which the acquiring device operates on a mobile telephone, a card manager or funds network may provide a downloadable mobile telephone application on a telephone owned and operated by the payee.

The "Third Party Check 21 processor" refers to an entity that performs automated clearinghouse operations to settle check-type negotiable instruments. In the embodiments described herein, the "third party Check 21 processor" is an entity distinct from the funds network, but it should be understood that the funds network can perform the functions associated with the Check 21 processor herein.

The "issuing bank" is a bank that sponsors a reloadable debit card manager's card program. As discussed above, the issuing bank owns the accounts into which funds are deposited in association with a debit card account managed by the card manager, to thereby load the card. The issuing bank provides permission to the Check 21 processor to settle funds into the issuing bank's accounts from the funds network to be loaded onto the card account managed by the card manager for the payee. Having received a check from the payee via the customer interface, the funds network presents the check to the issuing bank for payment via the Check 21 processor. It should be understood, however, that this arrangement is described for purposes of explanation and that other settlement processes could be utilized, for instance including forwarding funds to the bank via ACH or wire transfer.

The "Card Processor/Program Manager" is the card manager entity—i.e. the entity that manages transactions between the issuing bank and entities desiring to make debits against reloadable debit cards. The card manager also manages funds loads onto cards, in conjunction with the funds network as described herein.

In presently described embodiments in which the payee submits funds to a reloadable debit card, the payee enrolls both with the reloadable debit card manager and the funds network. As described herein, multiple card managers may enroll with the funds network so that the funds network is able to manage card load transactions with multiple different card managers. That is, the funds network is not simply a card debit/load network captured by a single card manager, but rather a card load network that is accessible by multiple card managers. Thus, enrollment with both the card manager and the funds network, and identification to both the card manager and the funds network in a given transaction, defines the transaction's path between the payee and the payee's reloadable card. In general, the card manager may require enrollment in order to associate the payee's identification with security measures to thereby confirm the payee's identity when the payee accesses the card manager's system. The card manager may require such security measures even when the payee interacts directly with a human operator but, in the presently described embodiments, requires such measures when the payee accesses the card manager's system via a device (such as a mobile telephone, kiosk, or ATM) that is geographically remote from the human operator. Such security measures may also facilitate the payee's use of card manager services other than negotiable instrument conversion, in those instances where the card manager provides other types of services. The payee's enrollment with the funds network allows the funds network to locate information needed to confirm that the payee's instrument should be converted to funds and, if so, to properly direct the instrument proceeds to a desired monetary repository.

Figure 7:
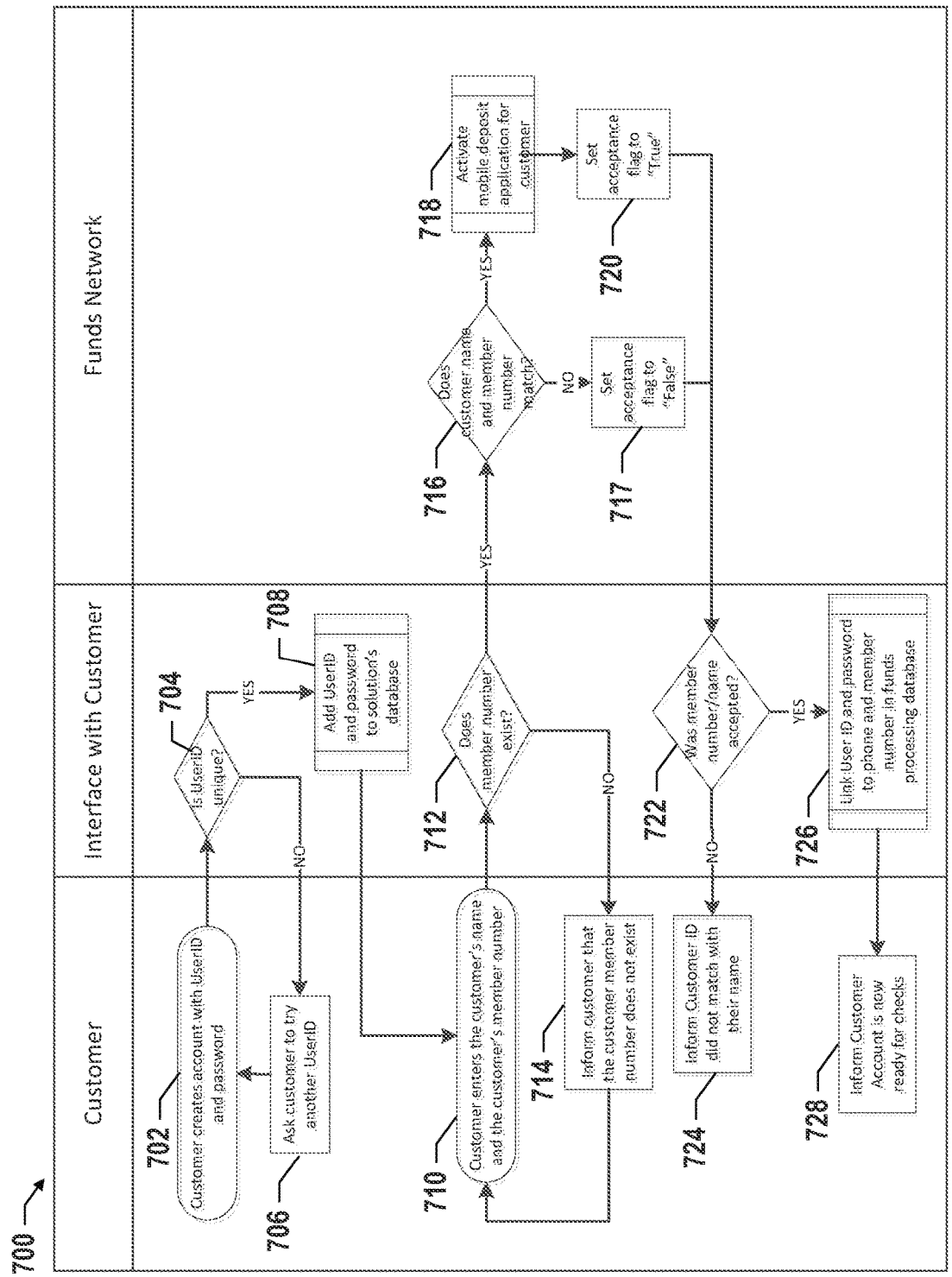
FIG. 7 is a flow diagram view of a method of enrolling a customer into mobile deposits according to another embodiment of the present invention.

As described below with respect to FIG. 7, the payee may have previously enrolled with the debit card manager to set up a card account by which the payee can load the card through various means and use the card to make debit purchases. As part of this process, indicated at 502 in FIG. 5, the card manager may collect certain information about the payee, e.g. the payee's name, address, telephone number, date of birth, card account number, and social security number, and the load network assigns a unique member ID token to the payee for the payee's use in association with the payee's reloadable debit card when loading checks. In determining whether to accept the payee as a customer, the card manager may conduct a credit search against the payee and thereby obtain a credit score applicable to the payee. If the card manager accepts the payee as a customer, the card manager may assign the payee to a card number or other identifier that associates with the payee a card that the card manager assigns to the payee. All of this information, including the payee-specific personal information, the third party-generated credit score, and the acquirer-assigned card number, is referred to herein as "customer information," and while it should be understood that the customer information may include the information explicitly described herein, it should also be understood that the particular elements of customer information may vary as needed and/or desirable within a given system.

The customer information is helpful to the funds network because it identifies a payee who may wish to use the funds network to convert a negotiable instrument to funds and allows the funds network to associate that customer identification with the monetary repository (in this instance, the card, as identified by the assigned card number) to which the instrument proceeds may be directed. Moreover, the remaining customer information can be helpful in assessing whether the funds network will accept a negotiable instrument that the payee later submits for conversion to funds. Accordingly, during the card enrollment process, the card manager queries the payee whether the payee wishes to be able to reload the card with proceeds of negotiable instruments the payee may later submit through the funds network. If the payee responds affirmatively, the card manager, at 502, sends the customer information to the funds network (via any suitable method, e.g. hard copy mail, voice telephone communication, wireless message, or network/Internet computer communication), which in turn enrolls the customer with the funds network, at 504. In so doing, the funds network generates a member identification (member ID) unique to the payee within the funds network and associates that member ID with the payee's name, reloadable card number, and other customer information in database 202 (FIG. 4). It should be understood, however, that this method of enrolling the payee in the funds network is presented solely for purposes of explanation and that other methods could be used.

For instance, where the payee chooses not to enroll with the funds network at the time the customer enrolls with the card manager, the payee may later enroll with the funds network by interacting directly with the funds network, e.g. through an Internet connection or a mobile telephone application provided by the funds network, and providing the personal customer-specific information through an interactive question-and-answer function on the mobile application or on a web page maintained by the funds network entity. The funds network may allow the payee to directly enroll with the funds network, and thereby obtain a member ID, without having a reloadable debit card. Such payees may, for example, convert check proceeds to funds by directing check proceeds to an e-wallet or to distribution as currency. Alternatively, and referring to FIG. 6, the payee may enroll with the funds network at the time the payee attempts to convert a negotiable instrument to funds and deposit the instrument proceeds to a reloadable card. At 602, for example, the payee may insert the reloadable card into an automated teller machine operated by a bank or other entity having a relationship with the funds network (such that the ATM programming provides an option (selectable by the payee via the ATM interface) to connect with the funds network), or insert the card into a kiosk controlled by a similar entity. The ATM or kiosk reads the card number from the card's magnetic stripe and prompts the payee to enter the payee's PIN. The ATM or kiosk operator (if different from the card manager) has a relationship with the card manager identified by the card number such that the ATM or kiosk programming communicates the card number and payee-supplied PIN to the card manager. The card manager server compares the PIN to the PIN stored in the card manager's database for this card number. If there is a match, the card manager server sends confirmation to the ATM or kiosk. The ATM or kiosk forwards the card number to the funds network via a secure Internet or other network connection.

The funds network server 200 (FIG. 4) then checks whether this card number is associated with a currently-enrolled customer record, as at 58 and 62 in FIG. 3B. If the member ID is associated with an e-wallet, then the answer to the query at 606 (described below) is "yes," and the steps following 606 occur as described below, except that steps 924 (FIG. 9) and 1040 (FIG. 10) refer to a transfer of funds to an e-wallet account and an update of the funds network database to reflect the increased e-wallet balance. Similarly, after step 1214 in FIG. 12 there is a check to confirm whether the transaction is for an e-wallet, a flag set that is detected after step 1250, followed by a similar e-wallet account transfer of funds and database update.

If the card number matches a record, the funds network server sets an accept flag at 614 and notifies the payee via a message to the ATM/kiosk to continue with the transaction, as at 622. The ATM or kiosk then requests the payee to submit the image of the check, as shown at 806 in FIGS. 8 and 83 in FIG. 3B, endorsed by the payee. As noted above, the endorsement can be made specially to the funds network, or can be a blank or general endorsement. Where the funds network acquires possession of the check via the Check 21 protocol at 812, the funds network becomes the check holder. The remainder of this procedure is described below with respect to FIG. 8.

If the payee accesses the system through a mobile telephone application, the mobile telephone application prompts the payee for the payee's mobile user ID and password. Upon receiving this information, the mobile application causes the mobile telephone to transmit this information to the card manager server, which in turn confirms the payee's identity and, if the payee has a funds network member ID, passes the member ID to the mobile telephone application. The mobile application causes the telephone to forward the member ID to the funds network, and the procedure continues in the same manner as discussed above for ATM or kiosk transactions.

As should be understood, these communications can be encrypted by various techniques that should be well known and that are therefore not discussed in detail herein. While it should be understood that various security measures can be employed, the present discussion refers simply to the conveyance of data and information.

Figure 6:
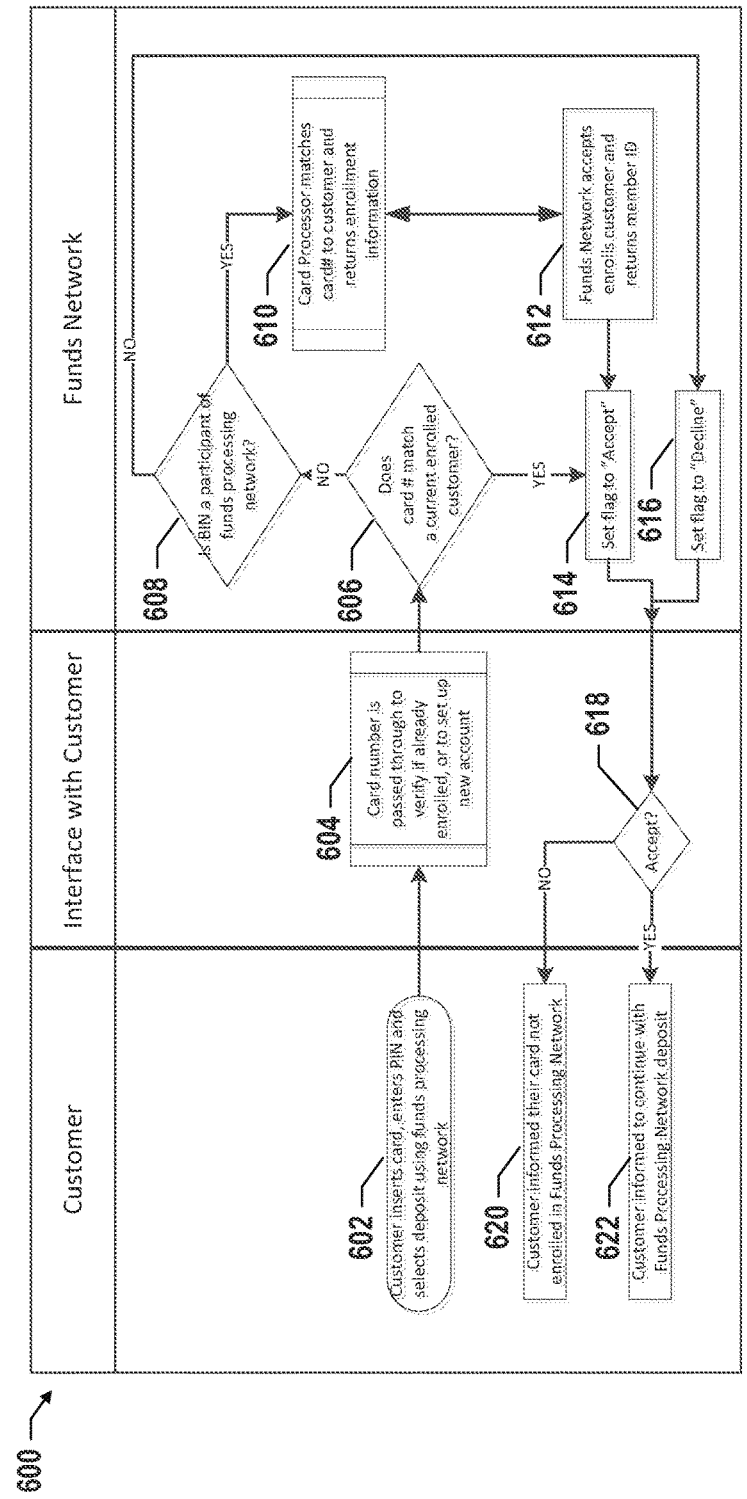
FIG. 6 is a flow diagram view of a method of enrolling a customer into a funds network according to another embodiment of the present invention.

Although not illustrated in FIG. 6, if the PIN does not match the card manager's PIN for the card number in a kiosk/ATM transaction, or if the user ID and password do not match the card manager's stored user ID and password for this card number in a mobile telephone transaction, the card manager sends a message back to the ATM, kiosk or mobile telephone, instructing the remote device to display a message to the payee that the payee's identification information is incorrect, and requesting that the payee re-enter such information or end the transaction. While the payee may re-enter the information to re-try the transaction, thereby starting a new transaction, the present transaction can be considered to end.

If the card manager verifies the card number and PIN, the ATM/kiosk forwards the card number to the funds network to confirm whether the card is enrolled with the funds network, at 604. At 606, the funds network server establishes a transaction record in database 202 (FIG. 4) for the payee's request and then queries database 202 with the card number to determine if the card number matches a card number stored in a database record in association with previously-stored customer information. If there is no such match, the funds network determines that the payee is not enrolled with the funds network and may (although this path is not shown in FIG. 6) directly set a status flag in the transaction record to "decline," as indicated at 616. If a match does exist, the funds network sets the transaction record flag to an "Accept" value at 614.

As used herein, "flag" refers to a value in memory or database that is selectable by computer program in response to a fulfilled condition. Server 200 returns the flag value from 614/616 to the ATM/kiosk/mobile telephone interface, at 618.

In one embodiment, if the card number does not match a customer record in the funds network database at 606, the funds network server identifies that portion of the card number that identifies the card manager (the bank identification number, or BIN). The funds network and the card manager have a contractual relationship that governs the manner in which transactions involving the parties are handled, and the funds network establishes records in database 202 that associates the card manager's identity to BINs of reloadable cards managed by the card manager. Accordingly, the funds network server compares the payee card's BIN with BINs of those card managers in the funds network database that are funds network participants. If the card's BIN does not match any participant's BIN stored in the funds network database, the funds network server sets the transaction record flag to "Decline" at 616.

If, at 608, the payee's card does match an existing card manager BIN in the funds network database, the funds network queries the card manager (via an Internet or other network connection) for the customer information associated with the card number. If permitted by applicable regulations and agreements among the funds network, the card manager, and the payee, the card manager returns the payee's customer information at 610, and the funds network enrolls the payee in the funds network database as a customer, at 612, and sets the transaction flag to "Accept" at 614. The funds network server creates a member ID and, at 612, stores the member ID in the funds network database in association with the card number and other customer information, and provides the member ID to the card manager server.

At 618, upon receipt of the flag status, the ATM/kiosk/mobile telephone interface program determines whether to accept or decline the card. If the received flag value is "Decline," the interface provides a notification to the payee at 620 that the card has been declined because the card is not enrolled with the funds network. The notification may further state how the payee can become enrolled in the funds network, such as by obtaining a new re-loadable card. If the received flag value at 618 is "Accept," the interface provides a notification at 622 that the payee is allowed to proceed to initiate conversion of a negotiable instrument to funds through the funds network.

The procedure discussed above enrolls the payee in the funds network, thereby generating a member ID and allowing the payee to access the funds network through a manned check-cashing entity 206 (FIG. 4) or an ATM or kiosk, at which identity confirmation is accomplished through the payee's PIN. The mobile application, however, does not operate with a PIN. Instead, as shown in FIG. 7, the system establishes a username and password protocol for logging into the mobile application, and requires the funds network to activate the application. The two general steps are taken with two different parties: (1) the payee creates an account with login credentials with the card manager (blocks 702-708); and (2) the funds network activates the payee's mobile application to perform deposit operations on the funds network (blocks 710-728). The first stage allows the payee to log into the payee's telephone application, and the latter stage allows the funds network to authorize the payee's mobile deposits capture application to perform check pre-approval processes on the funds network.

At 702, the payee interacts with a setup routine in the mobile telephone customer interface (i.e. a routine forming a part of the mobile deposits capture application on the payee's mobile telephone) to identify the payee by card number and to create an account with the card manager and a user ID and password for the account. The interface provides fillable areas soliciting the payee to select a user ID and password, each of which may be a series of alphanumeric characters. After the payee has entered a proposed user ID and password, the interface causes the mobile telephone to transmit the user ID and password to the card manager over a cellular telephone network and possibly an Internet connection.

At 704, an automated server application at the card manager's site compares the user ID entered by the payee with user IDs stored in a database controlled by the card manager that stores data identifying individuals who have previously enrolled with the card manager. If a match exists, the proposed user ID is not unique, and the server sends an instruction to the mobile application to present a notification to the payee, at 706 to enter a different user ID, and processing returns to block 704.

On the other hand, if the user ID is unique to the card manager at 704, the card manager server enters and stores the unique user ID, and its associated password in the card manager's database at 708, thereby associating the user ID and password with the payee's account and allowing the payee to thereafter log into the mobile deposit capture application.

The card manager server then instructs the mobile telephone interface to display a request that the payee enter the payee's name and funds network member number, so that the funds network can activate the payee's mobile deposit application to allow the negotiable instrument deposit. As noted above, the card manager stores funds network member numbers in its database in association with card numbers, and so in notifying the payee that the user ID and password have been accepted, the card manager server may also retrieve and forward to the payee (via the telephone interface) the payee's funds network member number. At 710, the payee enters the payee's name and funds network member number into the mobile application's user interface, and the mobile application activates the mobile telephone to transmit the username and member number to the funds network server. At 712, the funds network server checks its internal database and determines whether the entered member number exists in internal database 202 (FIG. 4). If the queried member number does not exist in the database, the funds network server notifies the payee, via communication with the mobile device interface, that the customer number is incorrect. The payee may then re-enter the funds network customer name and number at 710.

If the funds network database has the member number, then at 716, the funds network server determines whether the customer name associated in the funds network database with the same member number as submitted with the payee's query (and located in the funds network database at 712) matches the customer name submitted in the payee's query. If this query returns a null value, the funds network sets an acceptance flag value to "False," at 717 and passes the "false" value to the mobile telephone interface.

If the query returns a matched customer name and member number, the funds network server activates the funds network account for remote access, thereby activating the payee's mobile deposit application, at 718 and sets the acceptance flag to "True" at 720. At this point, the funds network server allows the payee to initiate negotiable instrument deposits via the funds network using the mobile application (as is discussed below). The funds network transmits the flag value from 717 or 720 to the mobile telephone interface at 722.

If, at 722, the interface receives a "False" response from the funds network server, the interface notifies the customer at 724 that the submitted member number and customer name do not match.

If, at 722, the interface receives a "True" return from the funds network server, the interface causes the telephone to transmit this information to the card manager server, and at 726, the card manager server links the payee's user ID and password to the customer's mobile device and member number in the card manager's local database. The card manager server links the user ID and password to the customer's mobile device by identifying the mobile device's unique ID and storing the mobile device's ID and the member number in a database entry associated with the payee. The card manager server then notifies the payee, via the telephone interface, at 728 that the payee's account is now active, thereby allowing the payee to deposit negotiable instruments through the funds network using the mobile deposit application.

In one embodiment, each of the card manager's and the funds network's databases has only one entry per customer payee so that the database only includes one member number, customer name, and possibly user ID, etc. for each payee. This ensures that one payee does not enroll multiple times and facilitates quick and accurate identification of payee account at issue. Operations between the card member server and the funds network server occur over a network, such as a LAN, WAN, or the like. Each database may include one or more servers.

Figure 8:
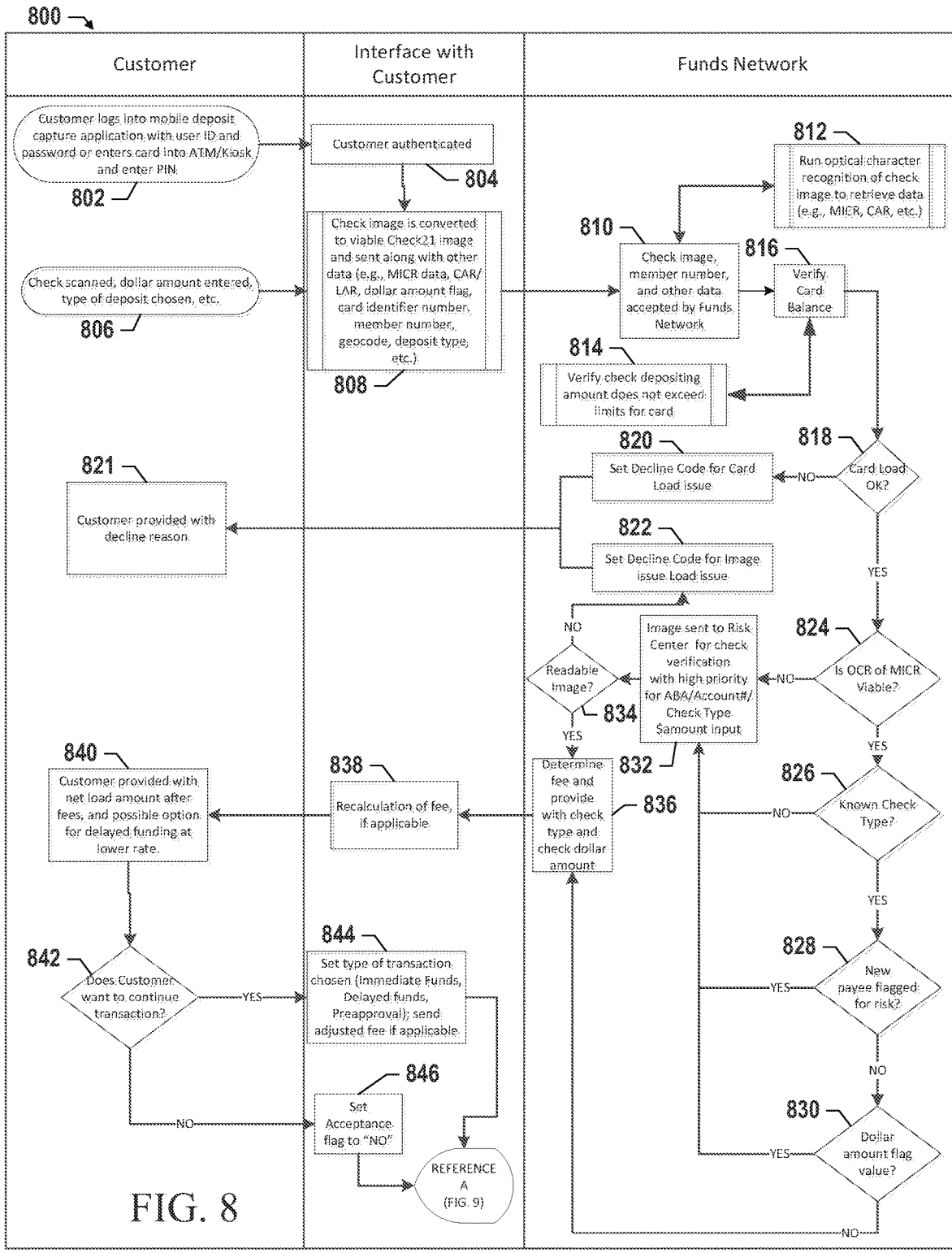
FIGS. 8-12 illustrate flow diagram views of methods of processing a negotiable instrument according to another embodiment of the present invention.

FIG. 8 illustrates an initial portion of a method 800 by which a payee deposits a check to a reloadable debit card using an ATM, kiosk or a mobile deposit capture application on the payee's mobile device, in which the system determines fees applicable to the transaction. Steps 802 and 804 summarize the steps described above with respect to FIG. 6. If by a mobile device, at 802, the payee logs into the mobile deposit capture application on the payee's now-registered mobile device by providing the payee's previously enrolled credentials (e.g., user ID and password, as described with regard to FIG. 7) to the card manager server for verification, at 804. If by ATM or kiosk, the payee swipes the reloadable card, and enters the payee's PIN, at the device, which then provides the card number and PIN to the card manager for verification, at 804. If, at 802, the payee attempts to authenticate with credentials that are not associated with a funds network member ID, then the card manager initiates enrollment with the funds network, as discussed above with respect to FIG. 5.

If authentication is successful, the card manager server notifies the customer interface, which prompts the payee to endorse the check to the funds network and then scan or otherwise image the check. The payee endorses the check in favor of the funds network and inputs various data, including the dollar amount of the check and the type of deposit (discussed below), and possibly other information as desirable in a given system, via the mobile telephone interface, at 806. The payee then initiates imaging of the front and back of the check by any means, such as by a scanner incorporated or associated with the ATM or kiosk, or by the payee's mobile device camera, or the like. If the payee is depositing a check with the ATM, the payee inserts the check into the ATM, and a scanner in the ATM images both the front and back of the check, and the ATM forwards the scanned front/back check image to the card manager server under the control of the interface. If the payee is depositing the check with the payee's mobile device, the mobile deposit applications interface instructs the payee to take images of the front and back of the check. The camera of the payee's telephone (or other remote device) then images of the front and back of the check. After the images are captured, the GUI prompts the payee whether to transmit the images to the funds network. If the payee selects an activation means (e.g., depressing a button) indicating the payee wants the mobile telephone to transmit the images, the mobile telephone transmits the images to the card manager server over the cellular network.

The deposit types correspond to respective protocols governing the procedure by which the funds network converts the applicable negotiable instrument to funds. In the presently described embodiments, the payee may select via the ATM/kiosk/mobile device interface (at 806) one of the following deposit types: immediate deposit, delayed funding, or pre-approval deposit (mobile telephone only, in some embodiments), but in other embodiments the interface may effect its own rules governing deposit type. For instance, where the card manager controls the customer interface, the card manager may require, and so correspondingly set in the interface, the deposit type for each transaction originating from a mobile telephone to pre-approval. The distinction among the deposit types, in the presently described embodiments, is primarily the condition that triggers each protocol to convert the negotiable instrument to funds. For immediate funded deposits, the triggering condition is approval of the instrument by the run rules, and possibly the risk center, or a third party check guarantor. For delayed funding deposits, the triggering condition is the passage of a predetermined period of time sufficient to allow a check to clear under normal (non-hold) circumstances. For pre-approval deposits, the triggering condition is the same approval, plus a request, following approval, to convert the instrument to funds. The different deposit types carry different fees, and each type is discussed below.

Under an "immediate deposit" procedure, the funds network loads the check proceeds to a designated re-loadable card at the time the check is presented for conversion to funds (assuming the check is approved for conversion to funds, as discussed herein), without waiting for the check to clear the maker's bank. As such, the funds are immediately available on the re-loadable card for the payee's use and can be immediately debited against the payee's reloadable card.

Under the "delayed funding" procedure, the check proceeds will not be available (and are on "hold") until a specific time period after submitting the check for conversion to funds. This delay allows time for the check to clear the maker's bank so that the funds network receives the check proceeds from the maker's bank prior to making the funds available to the customer. The delay or hold times may be, e.g., two to seven business days, or any time period desirable by the entity controlling the system, although preferably related to the check's expected settlement time.

Pre-approval check deposit means that when the payee submits an image of the check from a remote device, and in some embodiments only a mobile telephone, the funds network may approve the check for conversion to funds but does not make the funds available to the payee until the payee physically presents himself at a check cashing location, if obtaining currency, or remotely requests a load to a card. Where the payee deposits a check from a mobile telephone, the payee's remote device (i.e. the telephone) is unable to retain the paper check or provide currency to the payee. The pre-approval deposit therefore allows a payee to determine the check is approved for conversion to funds before traveling to a brick and mortar location to obtain currency and convey possession of the paper check. Since currency can be immediately provided from a kiosk or ATM, and since the ATM or kiosks can secure possession of the paper check (i.e. by retaining the physical check at scanning), pre-approval may not be provided as an option on those devices, in some embodiments.

Moreover, the interface at 802 may provide the payee not only with the option to select the deposit type, but also to select whether the entity at risk in the transaction (in the embodiments discussed herein, the funds network, the card manager, or a third-party guarantor) will have recourse against the payee in the event the check is returned after the funds conversion. That is, the payee can choose to convert an instrument to funds with recourse back to the payee, such that if the instrument is returned, the at-risk entity has the right to collect at least the instrument amount from the payee. Alternatively, the payee may select to deposit the instrument without recourse, so that the at-risk entity has no recourse against the payee in the event the check returns. The recourse/non-recourse choice applied to any of the deposit types, thereby doubling the available options. Recourse transactions carry a lower fee than non-recourse transactions, and so this choice, applied to a deposit type, defines the base fee.

In any event, at 808, the mobile application that interfaces with the payee, or the ATM or kiosk interface, receives the check image and converts the check image to a viable image acceptable to the funds network. The interface then sends a copy of the converted check image to the funds network server, along with the check's magnetic ink character recognition (MICR) data that the interface extracts from the front image of the check using optical character recognition (OCR) software, courtesy amount recognition (CAR, also extracted via OCR software), a flag value indicating a possibly-fraudulent dollar amount if the interface determines that the CAR does not match the check amount entered at 802, the re-loadable card number (in the case of an ATM or kiosk), the payee's funds network member number (in the case of a mobile telephone), a geocode of a mobile telephone, a location of a kiosk or ATM, the selected deposit type, and the like. As will be discussed below, the geocode relates to the geographical coordinates of the mobile telephone through which the payee submits the negotiable instrument for conversion to funds at a predetermined time, such as when the payee deposits the instrument.

At 810, the funds network server receives the check image, member number and other data from the interface. Receipt of this check information from the interface is considered a request, to the funds network, to approve the check for conversion to funds. In the case of immediate funding and delayed funding, it is also considered a request to convert the check to funds. In the case of pre-approval deposit, the request to convert to funds comes later, as described with respect to FIG. 12.

At 812, the funds network server, or in some embodiments the Check 21 provider, runs an OCR process on the check image received from the card manager server to extract text from the check, such as the MICR data, the CAR data, maker information and the like, as confirmation of the OCR data from step 808, and creates a substitute check (or image replacement document) under the Check 21 protocol for the funds network, so that the funds network has possession of the check. The funds network examines the OCR data obtained at both steps 812 and 808, at 824, to determine if the check image has a sufficiently high quality or if the check is a possible fraudulent check, as discussed below.

At 816, the funds network server verifies the balance on the re-loadable card, and obtains any load limits on the card, by querying the card manager server. Each re-loadable card has a balance, whether a zero or non-zero dollar amount. For some cards, there is a maximum amount that can be loaded onto the card. Since the funds network server knows the amount the payee is attempting to load on the card (from 806), the funds network server can determine if the maximum loadable amount will be violated for that card. For example, a re-loadable card may have a maximum loadable amount of $1500, and if the payee is attempting to load $500 on the re-loadable card with a balance of $1200, the card will only be re-loaded to $1500. Thus, at 814, the funds network checks to determine that the deposited amount from the check does not exceed a limit or threshold amount preset for the re-loadable card. If the limit or threshold will not be exceeded, a flag value is set indicating the card load is "OK"; otherwise, the funds network server may provide a notification to the payee that the limits of the card would be exceeded and disallow (setting the card load flag value to "not OK") the deposit to continue on the re-loadable card. At 818, if the card load flag value is "not OK," the funds network server sets a decline code at 820 as resulting from a "card load issue" and provides the payee (via the Internet, wireless or other network communication with the remote device which the payee presented the check) with the decline reason at 821; otherwise, method 800 proceeds to 824 for further processing.

At 824, the funds network automatically determines, via a computing device, whether the OCR of the MICR data is viable by comparing the MICR data, which was obtained from an OCR by the funds network server (at 812), with the MICR data obtained by an OCR from the customer interface (at 808). If the MICR data acquired in both instances is the same, the funds network server determines that the MICR data is viable. If the two MICR data instances do not match, the method proceeds to block 832, as discussed below.

At 826, the funds network server automatically determines if the check is a known check type. For example, if the funds network has previously seen the same ABA and account number as in the MICR line data for this check, the check type will have been stored by the funds network in its database in association with the corresponding ABA and account number, and the funds network can therefore determine whether this is a known check type from database 202. However, if the check type is not known, the funds network server sends the check image to the risk center at 832 for manual examination, as discussed below.

At 828, the funds network server automatically determines if the payee is a new payee, i.e. if this is the first transaction handled by the funds network for this payee. If the payee is a new payee, and also depending on the check type and check amount, the funds network server may transfer the check to be processed manually at 834 by the risk center. The criteria for determining risk associated with a new payee can vary as desired and depending on experience. The particular risk criteria are not, in and of themselves, part of the present invention.

At 830, the funds network server automatically reviews the check amount flag sent by the customer interface. If that flag indicates a potential discrepancy between the CAR value from the OCR, and the check amount entered by the payee, the funds network server directs the check to manual review, at 832.

Steps 824, 826, 828 and 830 comprise a sequence of automated check verification steps performed by the funds network server. If any of these verification checks/tests fail, method 800 proceeds to block 832, where the funds network server sends the check image to a risk center for manual verification.

At 832, the risk center receives images of a check triggered by one of the automated check verification processes, and a human operator at the risk center views the check images on a computer screen to manually determine factors needed to determine fees applicable to the load transaction and review for potential fraud.

Figure 9:
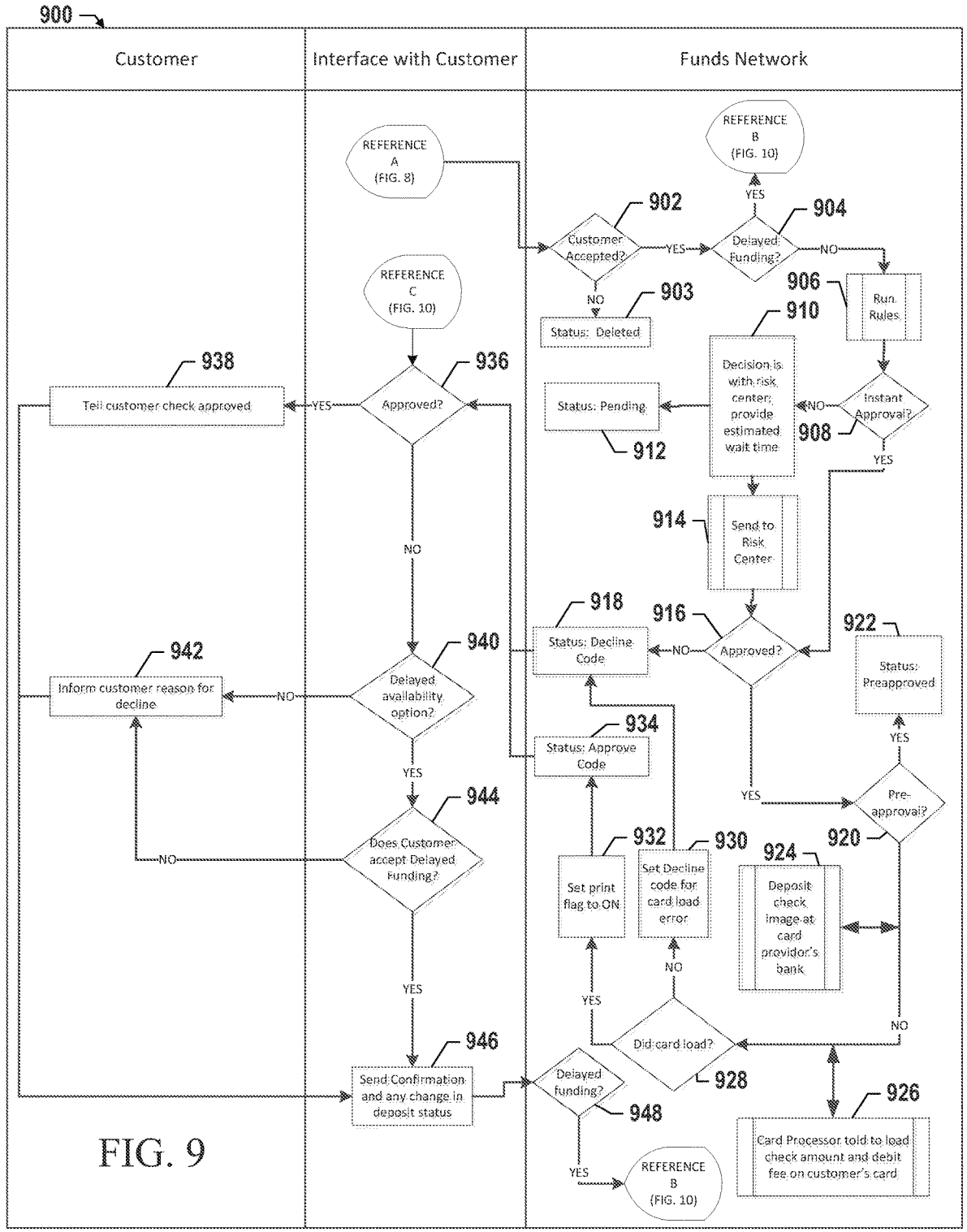

That is, in order to automatically determine the system transactions fees in the presently described embodiments, the acquired check images should be readable, and the check should be of a known type applicable to the underlying fee schedule, and the payee should have sufficient transaction history in the system that a normal risk profile applies, and the check amount entered by the payee should be the same as the amount on the check. If these conditions are true, then the system proceeds to step 836, without human intervention, to determine the fee as discussed below. If any one of the conditions fails, however, the funds network server forwards the check images to the risk center. If at 824 the acquired image is not sufficiently readable (i.e. the MICR data did not match, indicating the image from which the MICR data was extracted may be unclear), the operator viewing the images visually acquires the check information (including the MICR data) and interacts, via a user interface, with the funds network server to manually input the needed check information. If at 826 the ABA/Account number for this check is not already recorded in the funds network database, the check type is one the system does not yet recognize, and the operator viewing the images determines which of the system's predetermined check types is applicable to the check and, again, manually inputs this information. If at 828 the payee is a new payee, the risk center operator assigns a risk factor to the check that is considered by the run rules (FIG. 9). If at 830, the check's dollar amount indicates a possible amount issue, the risk center operator verifies and corrects if necessary.

If the image quality is so poor that the risk center operator cannot read the check information, the risk center operator (interactively through the funds network server's user interface) so notifies the funds network server at 834. The funds network server sets a decline code at 822 as resulting from an "images issue" and provides the customer interface with the decline reason at 821. The customer interface translates the decline code to a predetermined message and displays that message to the payee. If, however, the check images are readable, or if the risk center referral resulted from one of the verification steps 826, 828, or 830 (which are inherently correctable by the risk center operator), the funds network server, having received the information needed to establish the transaction fees, proceeds to step 836. In this process, the risk center operator can set a flag associated with the check to assure the funds network will not approve the check for immediate funding at step 906 (FIG. 9).

The funds network server applies a predetermined algorithm to determine the transaction fee on a given check load. As indicated above, in the presently described embodiments, the fee varies according the check type, with predetermined fees being applicable to the predetermined check types according to a look-up table maintained in the funds network database. The fees may also vary depending on the deposit type requested by the payee. For instance, the fee may be higher for an immediate deposit transaction than for a delayed funding or pre-approval transaction, and higher for a pre-approval deposit than for a delayed funding deposit, due to the higher risk to the funds network associated with immediate deposit. Each fee associated with a respective check type is comprised of two portions—one applicable to the funds network, and one applicable to the card manager. The card manager entity and the funds network entity may reach agreement regarding the fee, and how the fee portions are to be calculated, and how the fee is to be applied to the load amount (e.g. as a percentage applied to the total check amount, or as a flat fee that may depend in some manner on the check amount, varying with check type and/or deposit type, or some other algorithm), and the funds network can apply the result to each check conversion transaction on a transaction-by-transaction basis. The particular fee structure can be determined as desired and is not, in and of itself, part of the present invention.

Because the fee is applied on a transaction-by-transaction basis, and because both the funds network and the card manager actively participate in each transaction, either party can choose to discount its portion of the transaction fee on a transaction-by-transaction basis, or other basis, as desired. As noted, the funds network server establishes the fee at 836 based on the predetermined algorithm but can reduce its portion of the fee for a given transaction (or based on some other criteria, for example to reduce fees over a given calendar time period or for certain payees or for certain check types and/or deposit types) before passing the initial fee (indicating both the funds network portion and the card manager portion) to the card manager server at 838. At 838, the interface (operating automatically or in response to the card manager) can choose to modify the card manager's portion of the fee if the card manager so desires, for example based on a time period, payee identification, check type and/or deposit type.

At 840, the interface notifies the payee what the fee will be, and therefore the amount that will be loaded onto the payee's re-loadable card. For example, if the total check amount is $500, and the fee at 836 is $10, but the program manager offers a $2 promotion at 838, the interface notifies the payee at 840 that the check amount is $500, that the total net load will be $492, and that the applicable fee is $8.

Additionally, at 840, the interface presents the payee an option to change the deposit type in order to incur a lower fee, or for any other reason. If the payee opts to change the deposit type, the user interface presents the payee with the deposit type options. If the customer selects a different deposit type, method 800 may return to block 836, and the funds network determines the fee based upon the newly-selected deposit type. The funds network server then presents the new fee to the card manager server 838, which presents the new fee and load amounts to the payee for acceptance, at 840. Alternatively, if the customer interface stores a fee table with the applicable fee data, the customer interface can recalculate the fee at 840, or display both fees up front for the payee's choice.

At 842, the customer interface presents an option to the customer whether the customer wants to continue with the deposit of the load amount, and subject to the fees, indicated at 840, and the customer interface presents the payee with a selectable option accordingly. The selectable option may be a button, drop down list or the like that allows the payee to provide an indication that the payee wishes either to proceed or not proceed with the deposit. The customer interface receives the payee's selection. If the payee does not want to continue, the remote device customer interface sets an acceptance flag in a transaction record to "NO," at 846. Otherwise, if the payee indicates affirmation to continue, thereby agreeing to the fees and total net amount, the interface so notifies the card manager server at 844.

At 844, the interface sets the type of transaction (e.g., immediate funding, delayed funding, or pre-approval) and sends this information, along with any applicable fee adjustment to the funds network at 902.

At 902, the funds network server receives the results of the fee query to the payee, including whether the payee wishes to continue with the transaction and deposit the net amount and any adjustment to the card manager fee portion. If the payee does not wish to continue, then at 903, the funds network server changes a status of the transaction record to "deleted," which ends the transaction. Unless required for regulatory purposes, the transaction record (which may be stored in random access memory) may be deleted.

Figure 10:
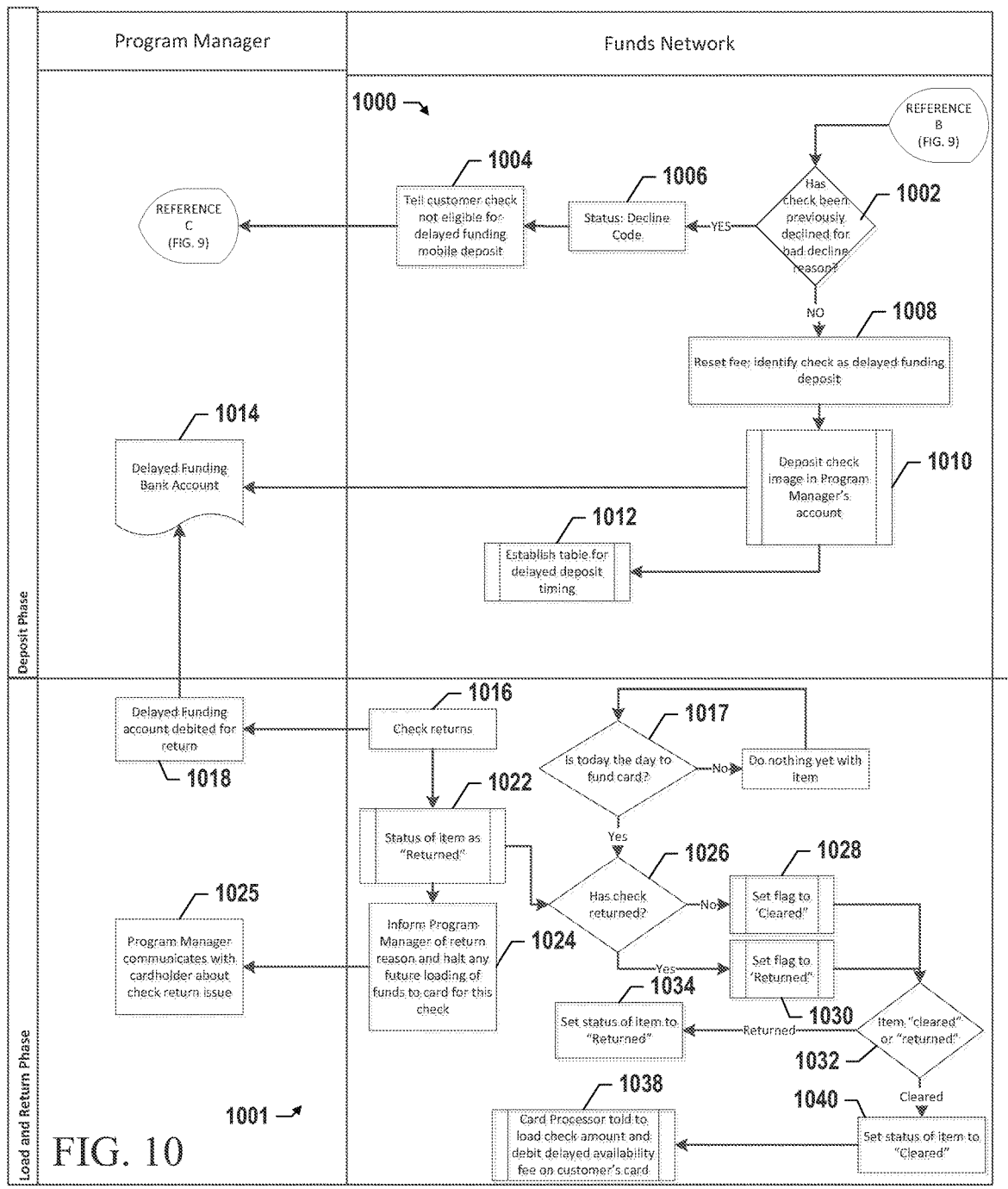

If at 902 the payee has accepted the transaction, and if at 904, the deposit type is delayed funding, method 800 continues to the procedure described with respect to FIG. 10; otherwise, method 800 continues to 906.

At 906 and 908, the funds network executes an automated algorithm against the check data to determine if the risk of instantly approving the check is below a predetermined threshold. If the algorithm determines the risk is below the threshold, processing continues at 916. Otherwise, the funds network server may determine that the risk is above the preset threshold and proceeds to steps 910-914. The funds network server provides the corresponding check images and associated check information for eventual processing by the risk center (914), at which a risk center operator manually evaluates the check and the risk (as discussed below). The particular steps, criteria and thresholds applicable to a determination that a submitted check should be converted to funds can vary as desired, for example based on a knowledge base of historical data that provides a statistical assessment of the likelihood of check validity under certain identifiable conditions. Such steps, criteria and thresholds themselves may vary based on the particular conditions in a given transaction, for instance depending on the deposit type and/or the recourse option the payee selects. The particular steps and criteria applied in rules at 906 can therefore vary according to circumstances and the experience and risk assessment of the entity operating the system and, therefore, do not, in and of themselves, form part of the present invention.

The present discussion assumes the funds network applies the run rules analysis at 906, but it should be understood that this function may be referred to a third party check guarantor, for example via an auction process as described above with respect to steps 84-96 in FIGS. 3B and 3C. In the event the guarantor function is taken by a different party, that party may agree to accept liability for the check amount if the check is returned. Following a referral to a third party for check verification, and receipt of a response from the third party, the method resumes at step 916.

If, at 908, the funds network server does not give instant approval to the check conversion following application of the run rules at 906, the funds network so notifies the risk center at 910 and changes the status of the transaction record to be "pending" at 912. The risk center estimates a wait time to reach a conclusion regarding check validation, and the funds network server may transmit this information to the customer interface to thereby notify the payee.

At 914, the funds network server sends the check image and corresponding information to the risk center, at which an operator visually evaluates the check image and reviews the information, applying a predetermined protocol of rules to thereby determine whether the check should be converted to funds. As described above with respect to step 906, the particular steps and criteria applied in the manual evaluation at 914 can vary according to the experience and risk assessment of the entity operating the system and, therefore, do not, in and of themselves, form part of the present invention. If, after application of the predetermined protocol at 914, the risk center operator determines the check should not be converted to funds, the risk center operator so notifies the funds network server via a user interface at 916, and the funds network server changes the transaction record status to "Decline" at 918. Otherwise, if the risk center operator determines at 914 that the check should be converted to funds, and so notifies the funds network server at 916, the funds network server determines whether the deposit type for this transaction is "pre-approval," at 920.

As discussed above, the pre-approval deposit type allows the payee to submit the check for conversion to funds but wait to receive currency until the payee presents the check to a card manager operator or funds network operator in person, or to later request a card load. If the payee has selected the pre-approval deposit option, the funds network notes this at 922, and the transaction moves to an inactive status, via step 936, until the payee re-engages the transaction, as discussed below with regard to FIG. 12.

If, at 920, the check deposit type is not pre-approval, and considering that the check deposit is also not delayed funding (see step 904), then the check deposit type is immediate deposit. Accordingly, at 924, the funds network deposits the check image, via the Check 21 procedure, in the reloadable card issuer's bank account at 924 and at 926 notifies the card manager server of the total check amount and the applicable fees. The deposit and load procedure is described below with respect to FIG. 13. The card manager server applies the load amount, less the fees, to the payee's card, and sends confirmation to the funds network server that the card has been successfully loaded, at 928. If, at 928, the funds network server receives confirmation that the card was loaded successfully, the funds network server sets a print flag to "on," indicating to the funds network server that the transaction successfully completed and sets a status code to "Approve" at 934. If, however, the card manager reports that the card did not successfully load at 928, the funds network server sets a card load error decline code in the transaction record at 930 and 918.

At this point, the transaction status is "Decline" at 918, or "Approve" at 934, or "Pre-Approval" at 922, and the funds network server communicates the relevant status to the customer interface at 936. The method of the communication between the interface and the funds network can be either a push or a pull. If, at 936, the status is approved, i.e. the payee's card has been loaded by the load amount (less fees), the customer interface so notifies the payee via the remote device, and communicates a confirmation back to the funds network server, at 946, that the notification has been displayed. This ends the transaction.

If, at 936, the status is "pre-approval," the customer interface so notifies the payee at 938 and the card manager at 946. The transaction is then dormant until the system receives a request from the payee to convert the pre-approved instrument to funds, as indicated at steps 1204-1208 in FIG. 12, through which the payee transfers possession of the paper instrument to the card manager. The interface may also provide the payee an option to locate a brick-and-mortar card manager facility, or an ATM or kiosk affiliated with the card manager, as described with respect to FIG. 11.

If, at 936, the status is declined, i.e. the check has not been converted to funds and the reloadable card not loaded, then the customer interface checks at 940 whether delayed funding is still an option for this transaction. Following the analysis steps 906 and 914, the funds network server records in the transaction record the basis for a check decline, and the funds network server passes this information to the customer interface at 936. By agreement, the funds network entity and the card manager entity determine which decline bases result in an absolute refusal to convert a check to funds. If any such bases exist in the transaction at hand at 940, the transaction is not eligible for delayed funding, and the customer interface so notifies the payee via the remote device at 942. The interface communicates a confirmation back to the funds network server, at 946, and the transaction ends. The particular criteria for determining when a refusal basis results in an absolute refusal to convert a check to funds can vary according to the experience and risk assessment of the entity operating the system and, therefore, do not, in and of themselves, form part of the present invention.

If, however, the basis for declining the load does not result in an absolute refusal at 940, then the customer interface queries the payee via the remote device, at 944, whether the payee would prefer to end the transaction or proceed under delayed funding. Also at 944, the customer interface accepts the payee's response and communicates that response to the funds network server. If the payee declines delayed funding at 944, the customer interface notifies the payee at 942 of the underlying basis why the transaction was declined, and the interface communicates a confirmation back to the funds network server, at 946, ending the transaction. If, however, the payee accepts delayed funding at 944, the customer interface changes the transaction status in its database to delayed funding, at 946, and notifies the funds network server of the deposit type status change, at 948.

FIG. 10 illustrates the processing of a delayed funding transaction. Whether the payee selected delayed funding initially (see step 904), for instance in order to have a lower transaction fee, or after a declined transaction (see step 948), the funds network server checks at 1002 whether the check has been previously declined for any of the reasons that would trigger absolute refusal. Of course, this will not be the case if the delayed funding transaction results from a selection at step 944, but it is possible that a payee is submitting a check after a previous refusal and selecting delayed funding at the outset of the new transaction, thereby triggering a delayed funding process at step 904. Because the funds network database stores the transaction records for declined transactions following steps 908 and 914, the funds network server can check the database against the check (MICR) number to determine if there are any previous transactions against this check number and, if so, what were any bases for declining the previous transaction. If at 1002 there is a previous transaction for the subject check that was declined for a reason causing an absolute refusal to convert the check to funds, then the funds network sets the transaction record to "decline" at 1006 and notifies the customer interface, which displays a notice to the payee, at 1004.

If, at 1002, there does not exist a previous basis for absolute refusal to convert this check to funds, the funds network server at 1008 communicates to the Check 21 processor that the check will be deposited immediately, but the card will be loaded a number of days later. This causes a change in how the transaction handles the deposit and initiates a process by which the Check 21 processor monitors the check's return status until the day of the card load, as described below.

At 1010, the Check 21 processor deposits the check in a card manager bank account, as indicated at 1014 (via the Check 21 process) and establishes or updates a table for delayed deposit timing at 1012. In this table, the Check 21 processor sets a date a predetermined time into the future to allow the check to clear the settlement process. The delay period is set to a default value, e.g. five business days, sufficient to allow a check to clear under normal (non-hold) circumstances. Regardless of the delay period's length, the Check 21 processor stores the delay in the database table in association with the check.

On a daily or other periodic or desired basis, at 1017, the Check 21 processor checks the table for any dates equal to the present date. If the present date is earlier than a date in the table for a given transaction record, the transaction remains dormant.

If, at 1017, the Check 21 processor identifies a date in the table that is equal to the present date, the time has arrived to assess whether the check associated with the date in the table should be converted to funds, and the Check 21 processor confirms at 1026 if the corresponding check has been returned. As noted above, the Check 21 processor deposited the check with the card manager's non-guaranteed account at step 1010, thereby triggering the check's submission into the settlement process. If the check is returned from the maker's bank for insufficient funds or other reason, the card manager's bank notifies the Check 21 processor, at 1016, which notifies the funds network server, which in turn records this information in funds network database 202 (FIG. 4) in association with the check number at 1022. The Check 21 processor also updates its table accordingly. The Check 21 processor or the funds network server notifies the card manager server of the return, and marks a record in the funds network database indicating this check is never to be converted to funds, at 1024. At 1025, the card manager entity notifies the payee of the returned check through means upon which the card manager and the payee have agreed, such as hard copy mail, telephone call, or electronic communication. The card issuing bank debits delayed funding account 1014 by the amount of the returned check, at 1018.

Accordingly, upon the check's delay period expiration, the Check 21 processor reviews the database table at 1026 to determine whether a return has occurred for this check. If so, the Check 21 processor sets the status of the check's transaction record to "Returned" at 1030. If the check has not been returned at 1026, the Check 21 processor sets the check's transaction record status to "Cleared" at 1028. The Check 21 processor passes these flags to the funds network processor, which determines the check's status, at 1032. If the check has cleared, the funds network server updates its database record at 1040 and notifies the card manager, which then loads the check amount onto the payee's reloadable card, less fees due to the funds network entity and the card manager entity, at 1038.

As noted above, the separation of the funds network and the Check 21 processor as distinct entities is for purposes of convenience in the presently described embodiments. It should be understood, however, that the Check 21 processor and the funds network could be the same entity.

Figure 11:
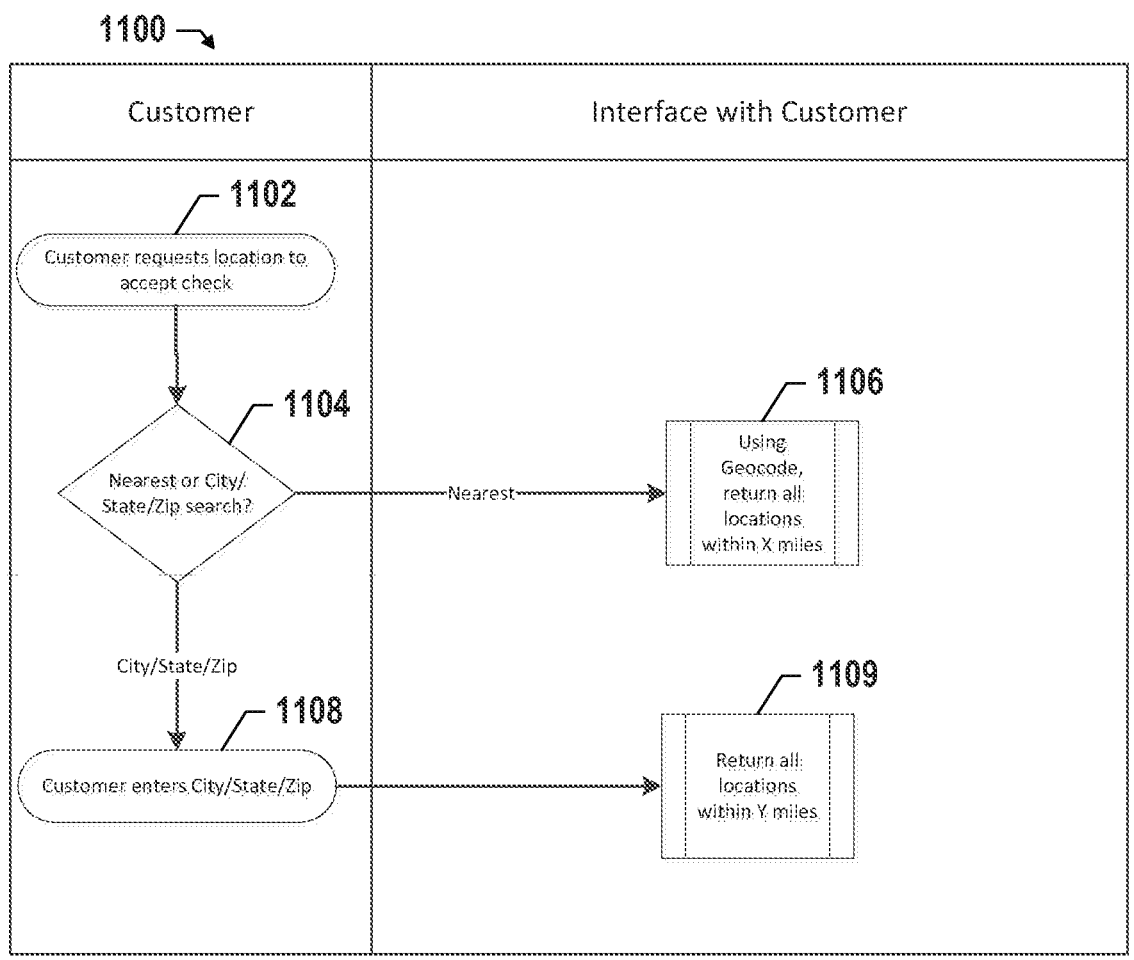

FIG. 11 illustrates an initial step in a method by which a payee locates a brick-and-mortar, ATM, or kiosk location through which the card manager can be accessed, to complete processing of a pre-approved check. As previously discussed, the payee can pre-approve a check through the remote device application. In that event, the funds network suspends action on the transaction, at 922 (FIG. 9), until receiving instructions from the payee to resume.

If the payee then wishes to complete the process of converting the check to funds, the payee can access a user interface on a mobile telephone through which the payee can request assistance finding a location to which to bring the check. Through the interface, the payee first requests a physical location at which to present the check, at 1102. The interface prompts the payee whether the payee wants to search for locations near the payee's current location, or whether the payee prefers to search by city/state/zip, at 1104.

If at 1104, the payee wishes to find the card manager location that is nearest to the payee's current location, the payee so indicates via the mobile telephone application. The mobile telephone sends a signal including the telephone's present geocode location, using a GPS routine in the mobile telephone. As previously mentioned, the geocode corresponds to and identifies the telephone's geographical coordinates. The interface receives and processes the telephone's current geocode received from the telephone's GPS module and compares the geocode with the locations provided by the card manager that have a geocode closest to the customer's geocode, within a radius the payee specifies via the interface (e.g., 1 mile) At 1106, the customer interface then retrieves all locations (from locations provided by the card manager within the specified radius of the payee's geocode and displays these locations to the customer via the interface for selection. The payee then selects a desired location and proceeds to that location.

If the customer wishes to perform a city/state/zip code search for a location at 1104, the interface presents to the payee a search screen that includes a portion that solicits various information from the payee, such as the zip code or the city and state where the payee wishes to search for card manager locations. The payee then enters either the zip code or a city and state, at 1108. At 1109, the customer interface finds all locations that are within a predetermined or selected range of the center of the specified city/state or zip code. The interface then displays these locations to the payee using the screen of the payee's mobile telephone.

The customer interface allows the customer to select a location at which to complete processing of the check, such as to present the check and receive funds via reloadable card deposit or currency.

Having obtained pre-approval of a check (FIG. 9), the payee will decide at a later time to convert the check funds. In so doing, and referring to FIG. 12, the payee determines at 1202, whether to present the check in person to a card manager operator at a "brick-and-mortar" location in exchange for currency or to load the check proceeds to a re-loadable card via a kiosk or ATM capable of accepting and securing possession of the paper check. If the former, the payee finds a brick-and-mortar location (FIG. 11) controlled by the card manager entity, travels to that location, and presents the physical check to a card manager operator. The payee requests to convert the check to funds and will transfer possession of the paper check to the operator. The operator obtains the payee's identification by any suitable means, for example, by a question/answer sequence or review of suitable documentation. Upon confirming the payee's identification to the operator's satisfaction or a predefined protocol, the operator scans the front and back of the check using a scanner connected to the card manager computer system, so that the card manager server receives the check image. Through a user interface at 1206, the operator also provides to the funds network server the check information, at 1208. That is, the operator, through the user interface and the network, forwards to the funds network the payee's request to convert the check to funds. The funds network matches the check information to previously approved, but not yet completed, transactions.

If the payee wishes to trigger conversion of a pre-approved check to funds using an ATM or kiosk, the payee swipes the payee's re-loadable card at a magnetic card reader associated with the ATM or kiosk (e.g. where the ATM interacts with the card manager server based on agreement between the card manager and the ATM owner). This allows the ATM or kiosk to acquire the reloadable card number and customer identity from the card's magnetic stripe, which triggers the device user interface to query the payee for the payee's PIN. If the payee successfully enters the PIN associated with the card number, the interface prompts the payee to scan the check and enter the check amount. The ATM or kiosk, at 1206, transmits the check image, card account number and check amount to the funds network server at 1208. This constitutes a request to convert to funds a pre-approved check.

As described above with regard to FIG. 9, when the funds network approves a check for which pre-approval is selected, the funds network sets the status of the transaction record associated with the check to "pre-approved." The collective group of transaction records set to "pre-approved" status may, therefore, be considered a queue, and at 1208, the funds network server queries this queue to determine if a transaction record matches the data in the request from the customer interface. Accordingly, at 1210, the funds network server searches the queue to determine if any transaction record has the same check MICR number as requested by the customer interface. If not, the funds network sets a predetermined flag in a response message to the customer interface to indicate that no match was found to the query in the funds network database, at 1212.

If the check MICR data matches a transaction record in the funds database at 1210, the funds network server compares the check amount provided in the customer interface request with the check amount stored in the matched transaction record. If these amounts do not match at 1214, the funds network server sets a flag in the response message to indicate the dollar amount mismatch, at 1216.

If the dollar amounts match at 1214, the funds network server determines at 1218 whether the customer interface request originates from a brick-and-mortar location or a remote device. This information is included in the request from step 1206, in that the originating device knows the request's origin and therefore includes suitable information. If, at 1218, the funds network server detects that the payee is present at a brick-and-mortar location in originating the request, the funds network server changes the status of the applicable transaction record to "approved" at 1220, and sets a flag in the card manager response to "approve," at 1222. The funds network server then determines, at 1226, whether a third party Check 21 provider is affiliated with the card manager entity and authorized to deposit the checks with the card manager's bank. If so, the funds network deposits the check, via the Check 21 processor, with the issuing bank, at 1230. Fees are deducted and provided to the funds network and the card manager as discussed below with regard to FIG. 13.

If, at 1218, the funds network server determines that the request from the customer interface is not from a brick-and-mortar location, the funds network determines whether the card number included with the request from the ATM or kiosk is associated with an account identified in the funds network database, at 1224. In another embodiment, this step may be omitted. If so, then, at 1228, the funds network server transmits a message to the card manager server to load the check amount on to the payee's card, as identified by the card number in the request. The card manager deducts fees as discussed below with regard to FIG. 13. The funds network server sets a flag in the card manager response to indicate a card load, at 1227, and the Check 21 processor deposits the check image at the issuing bank.

If the card number included in the request is not associated with an account at 1224, the funds network server sets a flag in the customer interface request to indicate the problem, at 1225.

When the funds network server sends the response to the customer interface, the customer interface reacts to the flag settings, as indicated at steps 1232-1250. If the response indicates, at 1232, that no match was found for the MICR number at 1212, the customer interface provides a notice to the payee, via the device interface if by ATM or kiosk, or by communication from the human operator if by brick-and-mortar location, that the check number could not be found and that the payee should resubmit the request, at 1234. If, at 1236, the customer interface determines from the response that the dollar amounts did not match at 1214, the customer interface notifies the payee of this problem at 1238, and again prompts the payee to resubmit the request. If, at 1240, the customer interface determines that the funds network server approved the conversion to funds at a brick-and-mortar location, the computer system utilized by the requesting operator informs the operator to pay the funds, at 1242, who provides currency to the payee, at 1244. If the customer interface server determines, at 1246, that a request from a remote device did not include a valid card number at 1224, the customer interface notifies the payee, at 1248, that the pre-approved check request is not associated with a card linked to an account. If, at 1250, the customer interface determines from the funds network server response that the pre-approved check proceeds were loaded on to a card at 1224 and 1228, the computer system utilized by the requesting operator, at 1252, notifies the payee of the card load, at 1254.

Figure 12:
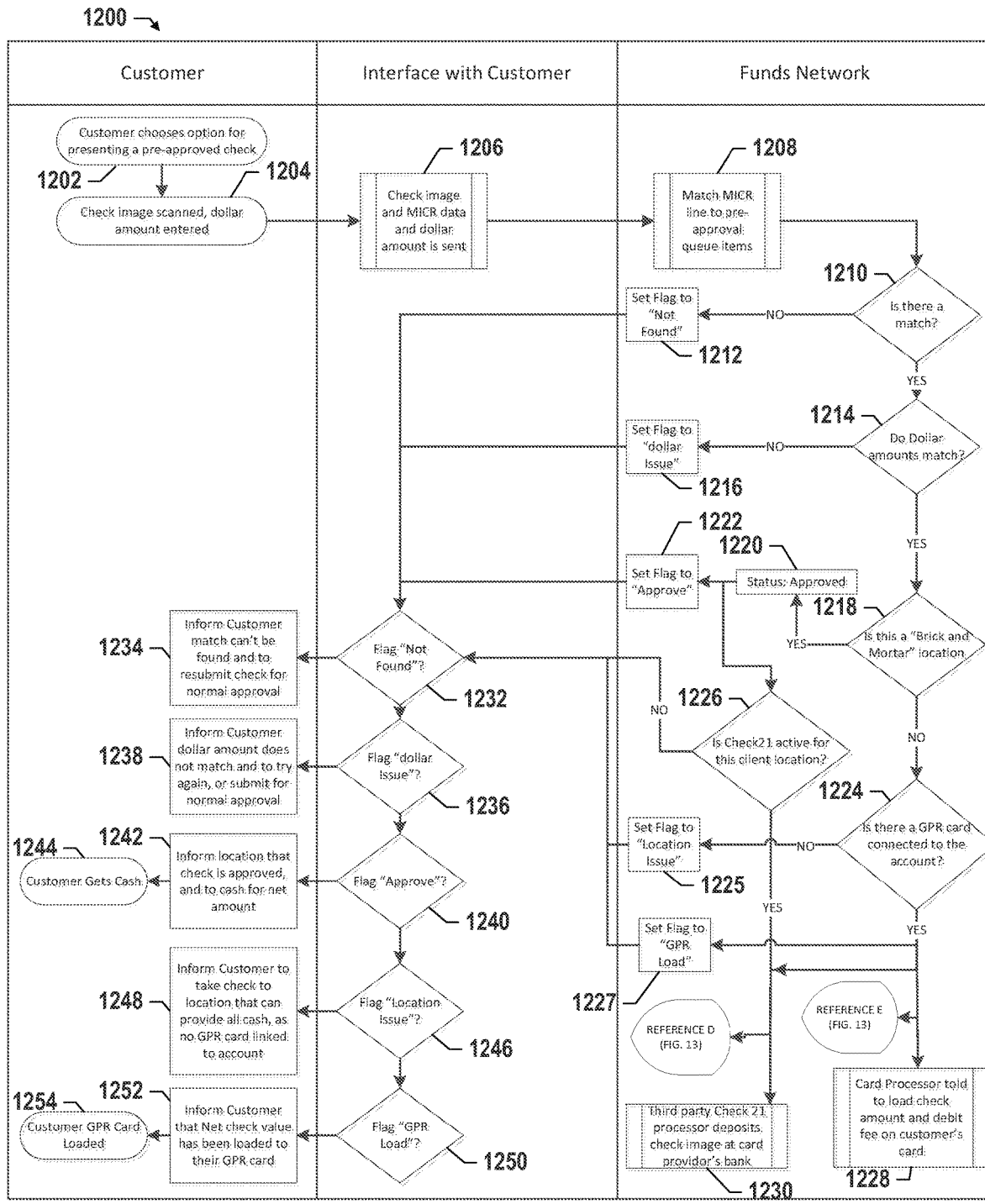
Figure 13:
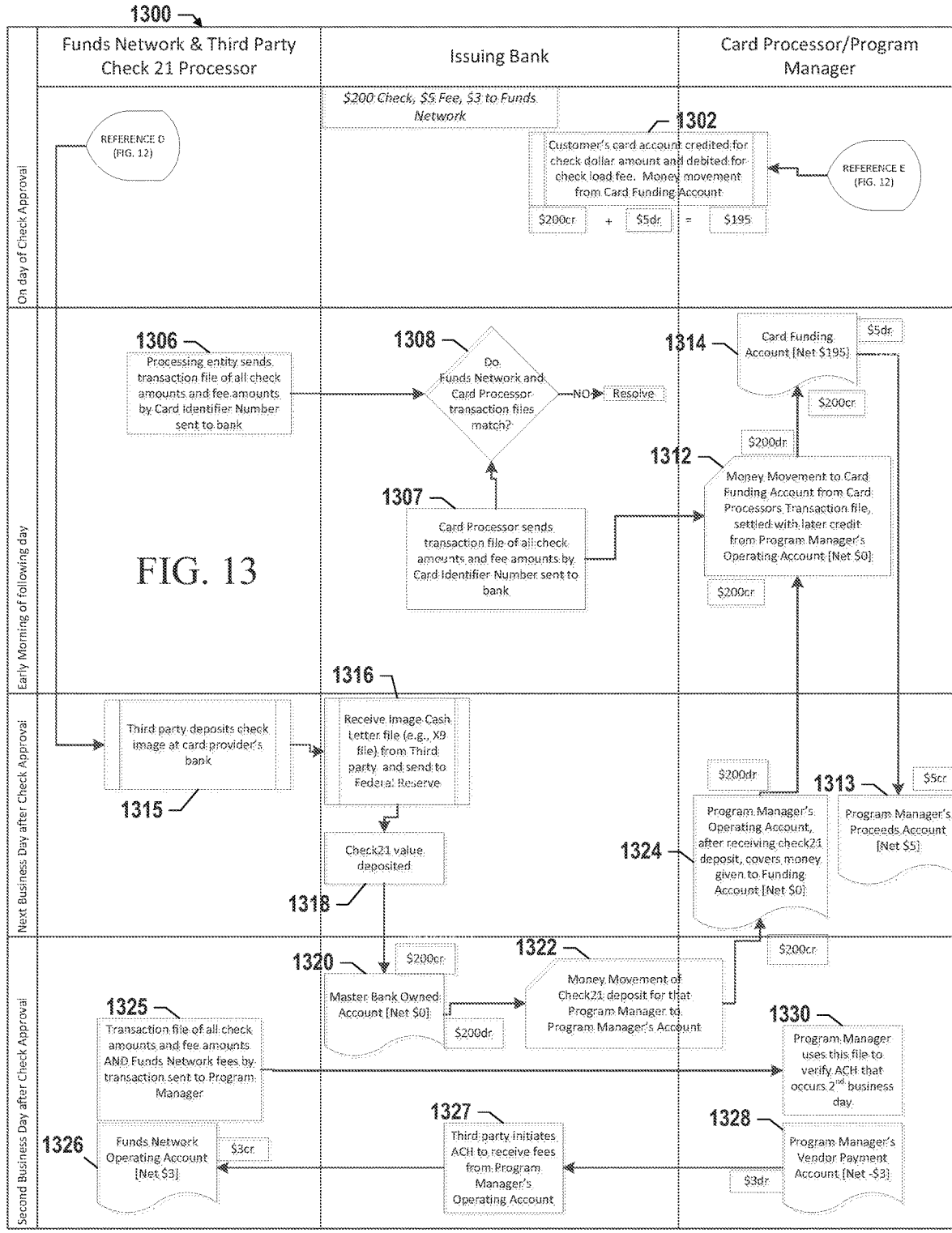
FIG. 13 is a flow diagram view of a method of depositing funds according to an embodiment of the present invention.
Figure 14:
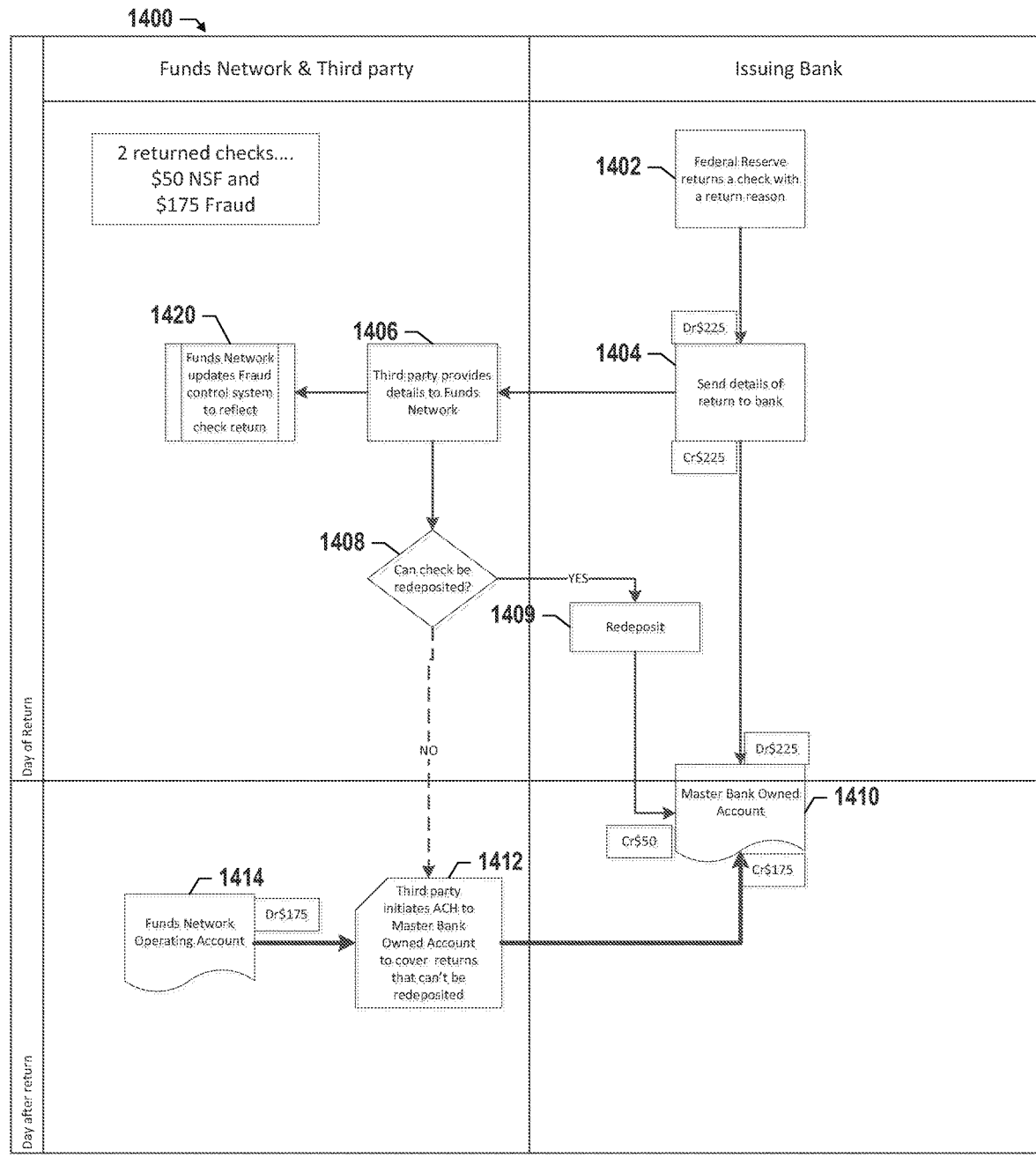
FIG. 14 is a flow diagram view of a method of processing returned checks according to an embodiment of the present invention.

FIGS. 13-14 illustrate settlement of deposit transactions following from pre-approval checks as in FIG. 12 or from immediately deposited check as in FIG. 9. Referring first to FIG. 13, reference "E" is a continuation of blocks 1224/1228 of FIG. 12 or step 926 of FIG. 9 or block 1038 of FIG. 10, and reference "D" results from either block 1224 or 1226 of FIG. 12 or step 924 of FIG. 9.

FIG. 13 illustrates an exemplary transaction, in which the check deposit is $200 and the fees $5. The card manager distributes $3 of the $5 fee to the funds network, and the card manager thus keeps $2 of the $5 charged fee. Other dollar amounts are certainly possible, and these exemplary amounts are used solely for ease of illustration.

Reference "E" in FIG. 13 illustrates method 1300 proceeds to 1302, where the issuing bank credits the payee's card account for the dollar amount of the check ($200) and debits the payee's card account for the check load fee ($5), as is discussed below. Therefore, the total net amount that is deposited in the actual card account is $195.

At 1306, the funds network server sends data describing the full amount of the check, and fee amount, to the card manager's issuing bank, in association with the re-loadable card identification number. The card identification number associates the check amount and fee charged with the specific re-loadable card.

At 1307, the card manager sends data describing the check transaction amount and the corresponding fee amount to the issuing bank (i.e. the bank that issues the card), in association with the card identifier number. This data should be the same as at 1306, which the issuing bank confirms at 1308.

Reference "D" flows from the remote device portion of the flow in FIG. 12 or step 924 in FIG. 9, to 1315, in FIG. 13, where the Check 21 processor deposits the check image at the card manager's issuing bank over an electronic network. The check image will be in the form of an image cash letter in the X9 file format, as required under Check 21 procedures. Upon initiation of settlement, the funds network adds a data record to the transaction table at database 202, recording the payee identity, maker identity, check number, check type, check amount, acquirer identity, date, fees, and card manager identity.

At 1316, the card manager's issuing bank receives the image cash letter file from the Check 21 processor and then forwards the image cash letter file to the Federal Reserve under Check 21 rules. At this point, at 1318, the issuing bank deposits the Check 21 value ($200) in a master bank account 1320. Thus, the issuing bank credits $200 in the master bank account.

At 1322, the issuing bank transfers the deposited money ($200) from the master bank account to the card manager's operating account 1324. As such, the master bank account has been credited the check amount and then debited the same amount, so the total net amount left in the master bank account is zero dollars.

At 1312, the issuing bank transfers the check amount from the card manager's operating account to the card funding account 1314. The issuing bank also debits the fee charged from the card funding account and credits this amount to the card manager's proceeds account 1313. For example, the issuing bank debits the $200 check amount from the card manager's operating account and credits this amount to the card funding account. At the same time, the issuing bank debits the $5 fee from the card funding account to the card manager's proceeds account. As such, a total net amount of $195 becomes the balance on the card funding account. The card funding account is the account to which funds available on the re-loadable cards must balance. Thus, funds in the card account are equal to the card load amount. The card manager uses the card manager's operating account for transferring check balances to card funding accounts. Thus the card manager uses the card manager's operating account as a temporary transfer means. The card manager proceeds account may be linked with the card manager's vendor account so that any fees owed to vendors are routed from the card manager's proceeds account through the card manager's vendor account 1328 (discussed below).

If the transaction is a delayed funding type, then once the card manager is informed to load the check amount at 1038 (FIG. 10), the card manager transfers the check amount from the delayed funding account (1014, FIG. 10) to the card funding account 1314, so that the transaction files match at 1308.

At 1325, the funds network server sends the transaction file, with check amounts and funds network fees, on a by transaction basis, to the card manager. This provides the card manager with the amounts that the card manager owes the funds network. The card manager uses the transaction file to verify that the ACH or electronic depositing has occurred at 1330.

At 1327, the third party Check 21 provider initiates an ACH or electronic transfer of funds from the card manager's vender account 1328 to the funds network's operating account 1326. In the ongoing example, the funds network is entitled to $3 of the $5 fee charged, and so the third party transfers $3 from the card manager to the funds network. At this point, the payee has $195 in his card funding account, the funds network has $3, and the card manager has $2.

FIG. 14 illustrates a flow diagram view of a method for processing two returned checks—one check being returned for insufficient funds (NSF) and another being returned for fraud in the amounts of $50 and $175, respectively.

At 1402, the Federal Reserve returns the check along with the reason for return. The Federal Reserve sends a message to the issuing bank, which informs the Check 21 provider, at 1404. Additionally, the Federal Reserve debits the issuing bank for such returned item, such as the $225 in the present example. The issuing bank then charges the master bank account 1410 the debits from the Federal Reserve. Thus, the issuing bank charges the master bank account $225.

At block 1406, the third party Check 12 provider provides the details of the return back to the funds network. This may be done by an electronic message that is then stored in a database at the funds network and is flagged for processing.

At 1408, if the check can be re-deposited, as is the case of the $50 check in the example, the Check 21 processor includes a redeposit of the item in the day's X9 file. If the check cannot be redeposited, the funds network operating account is instead debited by the Check 21 processor to the issuing bank for the full amount of the check, in this example $175.

Accordingly, in these embodiments, as in the embodiments discussed above with respect to FIGS. 3F and 3G, the funds network bears the risk of a returned check. It should be understood, however, that this risk can be allocated among the parties as desired. For instance, as discussed above, the payee can select to submit a check for conversion to funds with a right of recourse, so that if the check returns, the at-risk party may pursue the payee for reimbursement. Alternatively, as indicated at 121 in FIG. 3E, the funds network may have contractually acquired a right of recourse against a third-party check guarantor where the system relies on such parties. Moreover, the funds network may contract with the card manager to allocate a recourse right. This right may apply to all transactions or certain transactions, as agreed by the parties. For example, the funds network may agree to take the risk for immediate and pre-approval deposits, but the card manager take the risk on delayed funding transactions. Where a party other than the funds network has the risk, that party compensates the funds network for the full amount of the returned check, less the funds network fees, following step 1408, or for the full amount of the check, at step 121.

At 1420, the funds network then updates the database to indicate that the customer's check was returned and the reasons for such return. This allows for the funds network to identify which customers are a higher risk for processing checks so that future deposits may be more closely scrutinized.

While the above description is set forth with respect to one or more embodiments, it should be appreciated the principles of the present invention are equally applicable to other embodiments within the scope of the present disclosure and claims. Such other modifications and variations to the present invention may be practiced by those of ordinary skill in the art, without departing from the spirit and scope of the present invention, one or more embodiments of which are more particularly set forth in the appended claims. In addition, it should be understood that aspects of the various embodiments described herein and otherwise may be interchanged both in whole or in part. Furthermore, those of ordinary skill in the art will appreciate that the foregoing description is by way of example only and is not intended to be limitative of the invention so further described in such appended claims.

What is claimed is:

1. A method of converting to funds a negotiable instrument made to a payee, the method comprising the steps of:
   providing a first computer system that is accessible to remote parties through a computer network and that is controlled by an entity;
   at a second computer system that is remote from the first computer system, prompting the payee to endorse the negotiable instrument and to image the negotiable instrument at the second computer system;
   at the second computer system, acquiring an image of the negotiable instrument, endorsed and imaged in response to the prompting step;
   at the second computer system, extracting first magnetic ink character recognition data from the image acquired at the image acquiring step;
   providing a computer readable medium containing program instructions executable by the first computer system and that causes the first computer system to execute the step of providing a plurality of procedures for converting negotiable instruments to funds, wherein each procedure of the plurality of procedures bases negotiable instrument conversion to funds at least in part on a respective requirement that is different from the respective requirement corresponding to each other procedure of the plurality of procedures; and
   at the second computer system, acquiring from the payee a selection of a procedure of the plurality of procedures,
   wherein the program instructions are executable by the first computer system to cause the first computer system to execute the steps of
      receiving, at the first computer system via the computer network from the second computer system, information comprising the image of the negotiable instrument, identification of the payee, a monetary repository to which funds are to be transferred, the first magnetic ink character recognition data, and identification of the procedure of the plurality of procedures selected by the payee,
      extracting second magnetic ink character recognition data from the image received at the receiving step,
      comparing the second magnetic ink character recognition data to the first magnetic ink character recognition data, and
      in response to the comparing step, directing settlement of the negotiable instrument, and
   wherein
      if the procedure of the plurality of procedures selected by the payee is a first procedure of the plurality of procedures, the first computer system applies a predetermined set of risk rules to information relating to the negotiable instrument and initiates transfer to the monetary repository of an amount of funds corresponding to a value of the negotiable instrument based upon an outcome of the application of the predetermined set of risk rules without further instruction from the payee,
      if the procedure of the plurality of procedures selected by the payee is a second procedure of the plurality of procedures, the first computer system initiates transfer to the monetary repository of an amount of funds corresponding to a value of the negotiable instrument based upon passage of a predetermined period of time following execution of the directing step, during which the negotiable instrument is not rejected for payment,
      if the procedure of the plurality of procedures selected by the payee is a third procedure of the plurality of procedures, the first computer system initiates transfer to the monetary repository of an amount of funds corresponding to a value of the negotiable instrument based upon an outcome of the predetermined set of risk rules and receipt, at the first computer system via the computer network and a user interface, instructions from the payee to initiate transfer of funds to the monetary repository.

2. The method as in claim 1, wherein the second computer system is a wireless device, and wherein the computer network is a wireless network.

3. The method as in claim 2, further comprising, following the step of receiving, at the first computer system via the computer network from the second computer system, information comprising identification of the procedure of the plurality of procedures selected by the payee:
   determining, at the first computer system, whether a triggering condition corresponding to the selected procedure of the plurality of procedures occurs;
   if, at the determining step, the triggering condition corresponding to the selected procedure of the plurality of procedures fails to occur,
   presenting the payee, at the second computer system via a user interface, an option to select a different procedure of the plurality of procedures, and
   receiving, at the first computer system from the second computer system via the wireless network, instructions from the payee indicating a said different procedure of the plurality of procedures selected by the payee; and
   directing, at the first computer system, settlement of the negotiable instrument upon occurrence of a predetermined triggering condition corresponding to the selected different procedure of the plurality of procedures.

4. The method as in claim 1, wherein the executable instructions cause the first computer system to perform the step of determining a fee for converting the negotiable instrument to funds based at least in part on the procedure of the plurality of procedures selected by the payee.

5. The method as in claim 1, wherein the information received at the receiving step indicates a selection by the payee, in response to an option presented to the payee at the second computer system, whether to convert the negotiable instrument to funds with recourse to the payee or without recourse to the payee.

6. The method as in claim 5, wherein the executable instructions cause the first computer system to perform the step of determining a fee for converting the negotiable instrument to funds based at least in part on whether the payee selects conversion with recourse or conversion without recourse.

7. The method as in claim 1,
   wherein, at the receiving step, the monetary repository is a bank account that is associated with a re-loadable card associated with the payee,
   further comprising the steps of
      determining a fee to charge the payee, wherein the fee depends at least in part on the procedure of the plurality of procedures selected by the payee, and receiving a determination whether the entity will initiate transfer to the monetary repository of an amount of funds corresponding to the value of the negotiable instrument based on the procedure of the plurality of procedures selected by the payee, and wherein the transfer to the monetary repository of an amount of funds corresponding to the value of the negotiable instrument is made to the bank account.

8. The method as in claim 1, wherein the directing step comprises directing settlement of the negotiable instrument with recourse to the entity.

9. The method as in claim 1, wherein the directing step comprises depositing the negotiable instrument in a bank account.

10. The method as in claim 9, comprising depositing the negotiable instrument as an image replacement document under the Check21 procedure.

11. The method as in claim 1, wherein the executable instructions cause the first computer system to perform the step of determining from the information a routing transit number for the negotiable instrument.

12. The method as in claim 11, wherein the executable instructions cause the first computer system to perform the step of determining a fee for converting the negotiable instrument to funds based at least in part on the routing transit number for the negotiable instrument.

13. The method as in claim 1, wherein the predetermined period of time following execution of the directing step is non-variable.

14. A method of converting to funds a negotiable instrument made to a payee, the method comprising the steps of:

providing a first computer system that is accessible to remote parties through a wireless computer network and that is controlled by an entity;

at a second computer system that is a wireless device that is remote from the first computer system, prompting the payee to endorse the negotiable instrument and to image the negotiable instrument at the second computer system;

at the second computer system, acquiring an image of the negotiable instrument, endorsed and imaged in response to the prompting step;

at the second computer system, extracting first magnetic ink character recognition data from the image acquired at the image acquiring step;

providing a computer readable medium containing program instructions executable by the first computer system and that causes the first computer system to execute the step of providing a plurality of procedures for converting negotiable instruments to funds, wherein each procedure of the plurality of procedures bases negotiable instrument conversion to funds at least in part on a respective requirement that is different from the respective requirement corresponding to each other procedure of the plurality of procedures; and at the second computer system, acquiring from the payee a selection of a procedure of the plurality of procedures, wherein the program instructions are executable by the first computer system to cause the first computer system to execute the steps of receiving, at the first computer system via the computer network from the second computer system, information comprising the image of the negotiable instrument, identification of the payee, a monetary repository to which funds are to be transferred, the first magnetic ink character recognition data, identification of the procedure of the plurality of procedures selected by the payee, and a selection by the payee, in response to an option presented to the payee at the second computer system, whether to convert the negotiable instrument to funds with recourse to the payee or without recourse to the payee, extracting second magnetic ink character recognition data from the image received at the receiving step, comparing the second magnetic ink character recognition data to the first magnetic ink character recognition data, and in response to the comparing step, directing settlement of the negotiable instrument, and wherein if the procedure of the plurality of procedures selected by the payee is a first procedure of the plurality of procedures, the first computer system applies a predetermined set of risk rules to information relating to the negotiable instrument and initiates transfer to the monetary repository of an amount of funds corresponding to a value of the negotiable instrument based upon an outcome of the application of the predetermined set of risk rules without further instruction from the payee, if the procedure of the plurality of procedures selected by the payee is a second procedure of the plurality of procedures, the first computer system initiates transfer to the monetary repository of an amount of funds corresponding to a value of the negotiable instrument based upon passage of a predetermined period of time following execution of the directing step, during which the negotiable instrument is not rejected for payment, if the procedure of the plurality of procedures selected by the payee is a third procedure of the plurality of procedures, the first computer system initiates transfer to the monetary repository of an amount of funds corresponding to a value of the negotiable instrument based upon an outcome of the predetermined set of risk rules and receipt, at the first computer system via the computer network and a user interface, of instructions from the payee to initiate transfer of funds to the monetary repository.

15. The method as in claim 14, wherein the executable instructions cause the first computer system to perform the step of determining a fee for converting the negotiable instrument to funds based at least in part on whether the payee selects conversion with recourse or conversion without recourse.

* * * * *